United States Patent
Katayama et al.

(10) Patent No.: US 7,275,101 B2
(45) Date of Patent: Sep. 25, 2007

(54) INFORMATION PROCESSING APPARATUS, MANAGEMENT CONTROL METHOD, COMPUTER PROGRAM AND MEMORY MEDIUM

(75) Inventors: Kojiro Katayama, Tokyo (JP); Shinichi Nakamura, Kanagawa (JP); Makoto Kawashima, Kanagawa (JP); Junichi Hirose, Sydney (AU); Kazushi Ohmori, Chiba (JP); Hiroyuki Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 09/987,486

(22) Filed: Nov. 15, 2001

(65) Prior Publication Data
US 2002/0083164 A1 Jun. 27, 2002

(30) Foreign Application Priority Data
Nov. 17, 2000 (JP) ............................. 2000-351242
Nov. 6, 2001 (JP) ............................. 2001-340615

(51) Int. Cl.
G06F 15/173 (2006.01)

(52) U.S. Cl. .......................... 709/224; 709/223; 347/7; 347/19; 347/23; 358/1.15

(58) Field of Classification Search ................ 709/223, 709/224, 207; 340/500; 347/7, 19, 23; 358/1.15
See application file for complete search history.

(56) References Cited

U.S. PATENT DOCUMENTS

| | | | |
|---|---|---|---|
| 5,446,672 A * | 8/1995 | Boldys ........................ 700/174 |
| 5,594,529 A | 1/1997 | Yamashita et al. .............. 399/8 |
| 5,769,269 A * | 6/1998 | Peters ........................... 221/7 |
| 5,880,965 A * | 3/1999 | Nakamura et al. ........... 700/175 |
| 5,940,653 A * | 8/1999 | Maekawa et al. ............... 399/9 |
| 6,338,539 B1 * | 1/2002 | Kobayashi et al. ........... 347/23 |
| 6,371,586 B1 * | 4/2002 | Saruta ............................ 347/7 |
| 6,533,383 B1 * | 3/2003 | Saruta et al. ................. 347/19 |
| 6,535,866 B1 * | 3/2003 | Iwadate ....................... 706/61 |
| 6,672,695 B1 * | 1/2004 | Naka et al. ..................... 347/7 |
| 6,971,732 B1 * | 12/2005 | Seshimo et al. .............. 347/19 |
| 2002/0054340 A1 | 5/2002 | Tokutomi et al. .......... 358/1.15 |
| 2002/0140748 A1 * | 10/2002 | Kanaya et al. ................. 347/7 |

* cited by examiner

*Primary Examiner*—Saleh Najjar
*Assistant Examiner*—Liang-che Alex Wang
(74) *Attorney, Agent, or Firm*—Fitzpatrick, Cella, Harper & Scinto

(57) ABSTRACT

The information processing apparatus of the present invention comprises alarm means for informing an alarm to expedite the delivery of an expendable to a communication address assigned to a person in charge of distribution, in response, after the instruction for delivery according to the information on the expendable of predetermined type included in the inventory absence information received from a user base side and information for specifying the user, to reception of information indicating a decrease or absence of the inventory of the expendable of the predetermined type.

24 Claims, 36 Drawing Sheets

FIG. 8

| FIELD | LENGTH (BYTE) | USE |
|---|---|---|
| TAG | | |
| FLAG | 1 | B'100'=TCP/IP<br>B'010'=DIAL-UP<br>B'001'=E-MAIL<br><br>B'0'=SIMPLE OR FINAL DATA<br>B'1'=CONTINUED |
| DATA TYPE | 1 | X'01': REQUEST AUTHENTICATION<br>X'02': REQUEST PARAMETER SETTING<br>X'04': REQUEST DEVICE INFO<br>X'08': REQUEST EVENT INFO<br>X'10': RESPONSE<br>X'80': REQUEST DISCONNECTION |
| JOB ID | 1 | X'00': SET PARAMETER<br>X'01': ACQUIRE DEVICE INFO<br>X'02': NOTIFY EVENT INFO |
| RETURN | 1 | FOR X'10': RETURN VALUE<br>FOR X'80': REASON FOR DISCONNECTION<br>FOR OTHER DATA TYPE: SET X'00' |
| DATA LENGTH | 4 | DATA LENGTH (NETWORK BYTE ORDER) |
| DATA | VARIABLE LENGTH | DATA |

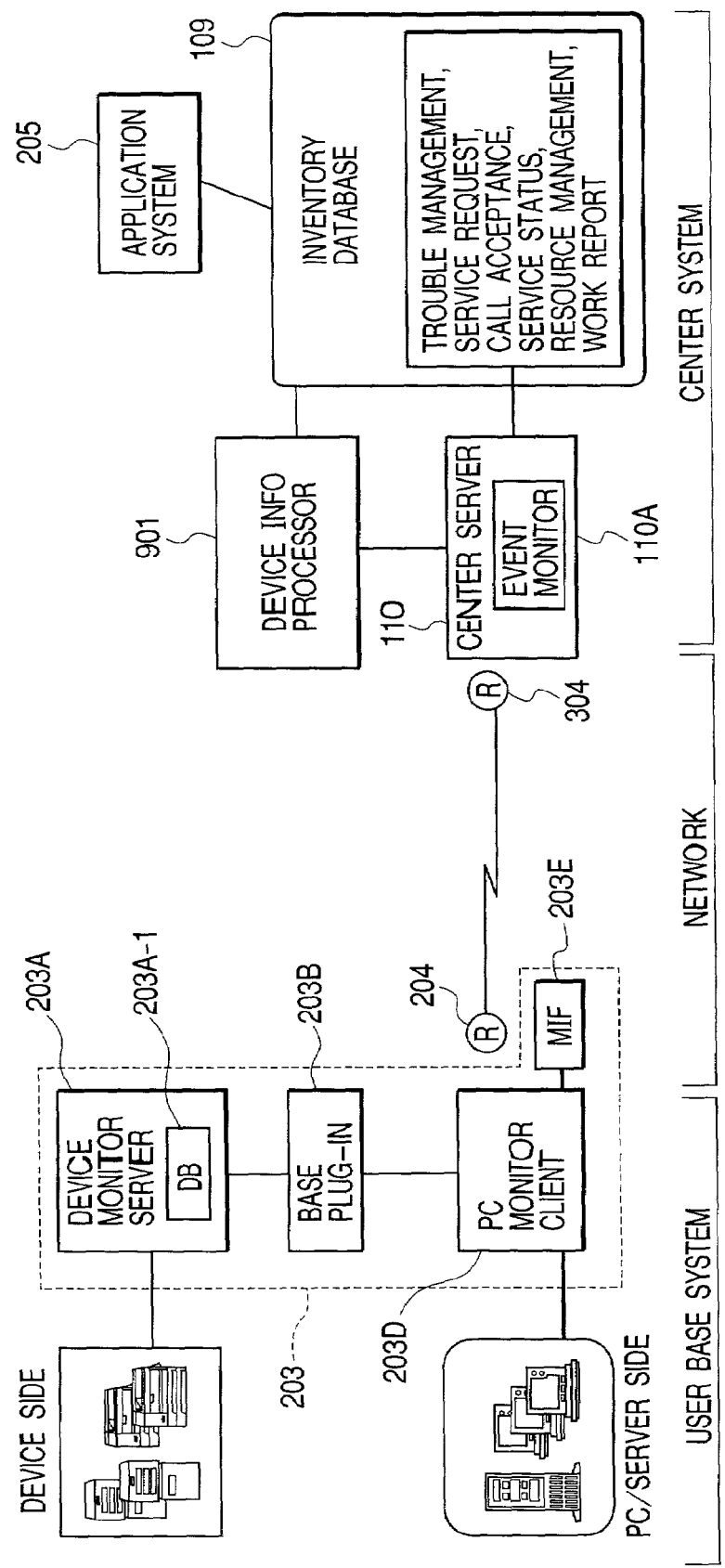

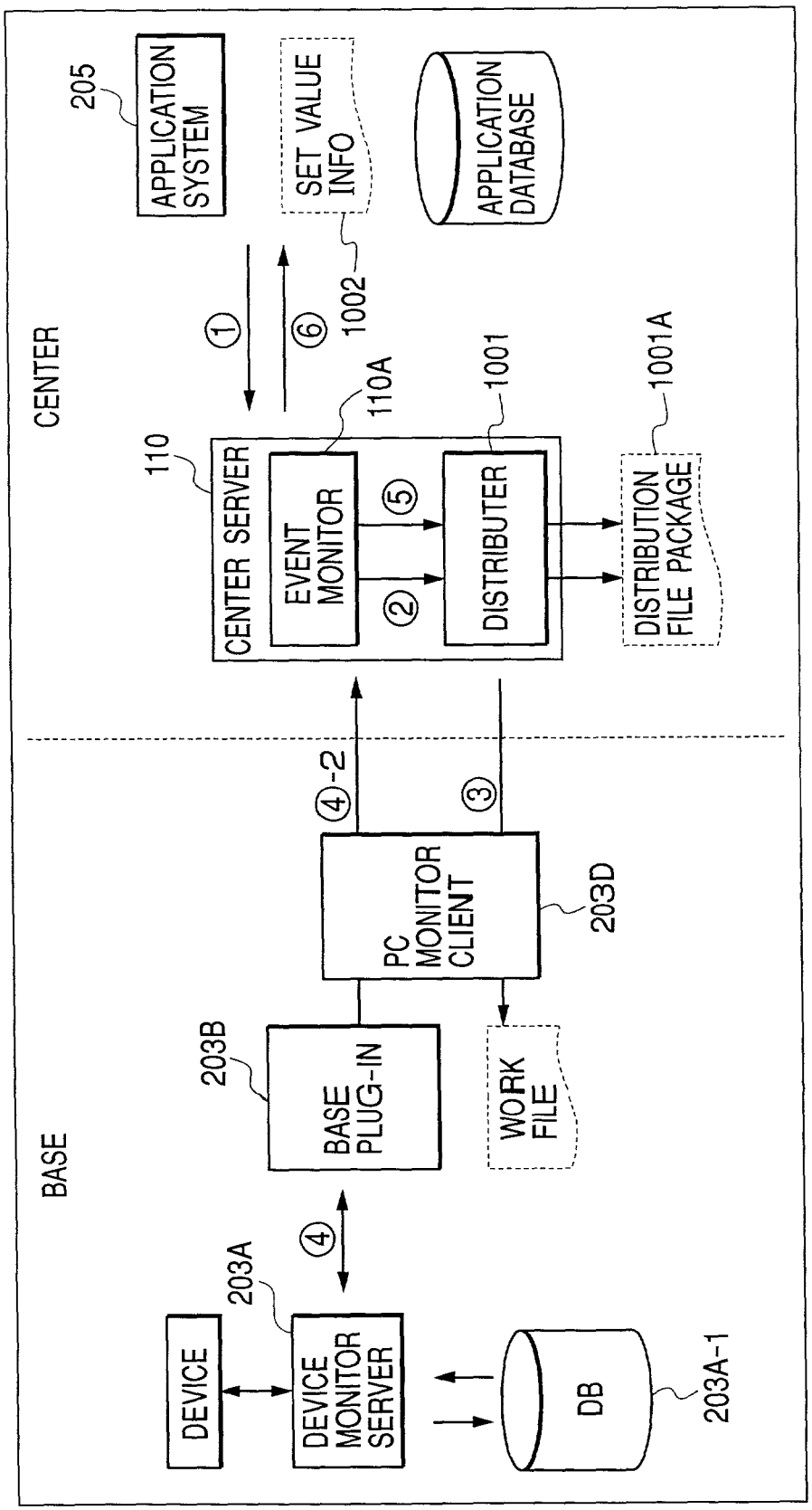

FIG. 23

| DEVICE CAT NO./ SERIAL NO. | MAC ADDRESS | IP ADDRESS | EXPENDABLE | 2ND LAST REPLACED | LAST REPLACED | NEXT |
|---|---|---|---|---|---|---|
| ABC12343 | 000085123456 | 111.222.333.444 | AAA | 7/12 | 9/12 | 11/12 |
| BCD98763 | 000085777777 | 111.222.333.555 | AAA | 8/2 | 10/12 | 12/2 |
| CDE55553 | 000085333333 | 111.222.333.666 | DDD-B | 8/30 | 9/30 | 10/30 |
| CDE55553 | 000085333333 | 111.222.333.666 | DDD-C | 7/21 | 9/21 | 11/21 |
| CDE55553 | 000085333333 | 111.222.333.666 | DDD-M | 8/16 | 10/10 | 12/16 |
| CDE55553 | 000085333333 | 111.222.333.666 | DDD-Y | 8/20 | 10/20 | 12/20 |

FIG. 24

| EXPENDABLE TYPE | STOCK | ORDER THRESHOLD | ORDER UNIT | STATUS |
|---|---|---|---|---|
| AAA | 5 | 2 | 4 | STOCK OK |
| BBB | 3 | 1 | 2 | STOCK OK |
| CCC | 2 | 1 | 2 | ORDER NEXT |
| DDD-B | 1 | 1 | 2 | ORDERED |
| DDD-C | 1 | 1 | 2 | REQUIRED TO ORDER |
| DDD-M | 2 | 1 | 2 | ORDER NEXT |
| DDD-Y | 3 | 1 | 2 | STOCK OK |

| BILL NO. | DATE OF BILL | APPROVE/ DISAPPROVE | APPROVE/ DISAPPROVE DATE | REASON FOR DISAPPROVAL |
|---|---|---|---|---|
| 1879-0001 | 9/30 | APPROVE | 9/30 | |
| 1879-0002 | 10/15 | APPROVE | 10/16 | |
| 1879-0003 | 10/30 | DISAPPROVE | 10/30 | 1 EP-J RETURNED |
| 1879-0004 | 11/10 | | | |

| EXPENDABLE TYPE 2701 | STOCK 2702 | ORDER THRESHOLD 2703 | ORDER UNIT 2704 | STATUS 2705 | 2706 |
|---|---|---|---|---|---|
| EP-J | 5 | 2 | 4 | STOCK OK | ORDER |
| EP-K | 3 | 1 | 2 | STOCK OK | |
| EP-L | 2 | 1 | 2 | ORDER NEXT | ORDER |
| CLC-B | 1 | 1 | 2 | ORDERED | |
| CLC-C | 1 | 1 | 2 | REQUIRED TO ORDER | ORDER |
| CLC-M | 2 | 1 | 2 | ORDER NEXT | ORDER |
| CLC-Y | 3 | 1 | 2 | STOCK OK | |

ORDERED

CLC-C [2] UNITS

EP-L [2] UNITS

2707

[OK] 2708 [CANCEL] 2709

FIG. 29

BILL

NO. 1879-0004

November ---, 2000
e-Maintenance Center

| MERCHANDISE | UNIT PRICE | UNITS | AMOUNT |
|---|---|---|---|
| AAA | ¥10,000 | 4 | ¥40,000 |
| BBB | ¥20,000 | 2 | ¥40,000 |
| DDD-C | ¥15,000 | 2 | ¥30,000 |
| TOTAL | | | ¥110,000 |
| TAX | | | ¥5,500 |
| BILL | | | ¥115,500 |

REASON FOR DISAPPROVAL

[APPROVE]
[DISAPPROVE]

BILL

November ---, 2000
e-Maintenance Center

| MERCHANDISE | UNIT PRICE | UNITS | AMOUNT |
|---|---|---|---|
| AAA | ¥10,000 | 4 | ¥40,000 |
| BBB | ¥20,000 | 2 | ¥40,000 |
| CCC | ¥15,000 | 2 | ¥30,000 |
| TOTAL | | | ¥110,000 |
| TAX | | | ¥5,500 |
| BILL | | | ¥115,500 |

This bill was approved by you November ---

FIG. 31

BILL

NO. 1879-0004 — 3105

November ---, 2000
e-Maintenance Center — 3104

| MERCHANDISE | UNIT PRICE | UNITS | AMOUNT |
|---|---|---|---|
| AAA | ¥10,000 | 4 | ¥40,000 |
| BBB | ¥20,000 | 2 | ¥40,000 |
| CCC | ¥15,000 | 2 | ¥30,000 |
| TOTAL | | | ¥110,000 |
| TAX | | | ¥5,500 |
| BILL | | | ¥115,500 |

3101   3102   3103

This bill was disapproved by you November ---
We will contact you soon.

FIG. 34

MONITOR WINDOW

LOG001-01

VIA
☐ Fax
☐ Mail

SEARCH CONDITION
SERVICE TYPE
☐ SERVICE ☐ SEPARATION ☑ EXPENDABLE

PROCESS TYPE
☐ UNPROCESSED ☐ PROCESSING ☐ PROCESSED

[SEND CONFIRMATION] [ENTER CONFIRMATION] [ENTER RESULT]

SEARCH PERIOD
☐ MONTH ☐ DATE ☐ YEAR ~ ☐ MONTH ☐ DATE ☐ YEAR

[SEARCH]  [RETURN]

| DATE | e-BOX ID CONFIRMATION NO. | DEVICE S/N | CUSTOMER NAME | SERVICE | ERROR | PROCESS |
|---|---|---|---|---|---|---|
| 2000/O/× 15:04:59 | EBOXRT000006 No.1879-0004 | | | EXPENDABLE | EXPENDABLE | UNDELIVERED |
| 2000/O/× 15:04:48 | EBOXRT000006 No.1879-0005 | | | EXPENDABLE | EXPENDABLE | UNPROCESSED |
| 2000/O/□ 08:42:34 | EBOXRR000001 No.1879-0006 | | | EXPENDABLE | EXPENDABLE | UNPROCESSED |
| 2000/O/□ 09:22:36 | EBOXRR000001 No.1879-0007 | | | EXPENDABLE | EXPENDABLE | UNPROCESSED |
| 2000/O/□ 16:36:53 | EBOXRR000001 No.1879-0008 | | | EXPENDABLE | EXPENDABLE | UNPROCESSED |

FIG. 35

CONFIRMATION

—3501

PRINT | REGISTER | RETURN

CUSTOMER INFO
ORDER NO.
DELIVER TO
WAREHOUSE
CORP NAME
ADDRESS
TEL          PERSON IN CHARGE  ABC
REMARKS                        3505

3502

EXPENDABLE INFO
MERCHANDISE NAME        TYPE       UNITS ORDERED   UNITS DELIVERED
☐ Toner (Black)         EP-L       3               3

3503

RESULT INFO
DELIVERY DATE  ☐ MONTH ☐ DATE ☐ YEAR    NAME OF DELIVERER

INFORMATION PROCESSING APPARATUS, MANAGEMENT CONTROL METHOD, COMPUTER PROGRAM AND MEMORY MEDIUM

BACKGROUND OF THE INVENTION

1. Field of the Invention

The present invention relates to an apparatus, a system, a method, a medium and a program for user support such as inventory management, order management etc. of an expendable to be used in an electronic equipment such as an office equipment connected to a network.

2. Related Background Art

In the office automation equipment such as the printer or the copying apparatus, there has been executed to detect the consumption of an expendable such as recording paper or toner by a predetermined amount at the equipment and to automatically place an order through a network or the like.

However, in case plural equipment are used for example in an office, the expendables corresponding to such equipment may be of different types. On the contrary, there is also assumed a case where the plural equipment may require different repairing works but use expendables of a same type. In such cases, the management is in fact required for each expendable used in each equipment.

Also the equipment of plural types can be generally classified into two types, namely those of device type, such as a printer, connected to a personal computer (PC), and those of PC/server type such as a personal computer (PC). However the equipment of these two types have respective specific error information, option information etc. and such information is difficult to manage in unified manner and have been managed individually.

On the other hand, the works relating to the expendable such as delivery, financing, recovery of expendable are not linked and have been executed inefficiently.

Particularly in case an expendable is ordered and the delivery of a new expendable to the customer is instructed but such delivery is not executed soon, it has not been possible to achieve prompt response.

In consideration of the foregoing, the object of the present invention is to enable, in case the electronic equipment of plural types are used for example in an office, the inventory management and order for each type of expendable corresponding to each electronic equipment.

SUMMARY OF THE INVENTION

The above-mentioned object can be attained, according to the present invention, by the following configuration.

There is provided an inventory management system including a first storage unit, adapted to store inventory information indicating an inventory number of an expendable which is mounted in a printer and can be replaced, the inventory number being reduced based on replacement of the expendable in the printer, a receiver unit, adapted to receive absence information indicating that the inventory number of the expendable is zero or less than a predetermined number and an instruction unit, adapted to provide, to an external apparatus via a communication line, a delivery instruction for delivery of a new expendable. Also included are a second storage unit, adapted to store history information indicating a history of the delivery instruction provided by the instruction unit and an alarm sending unit, adapted (i) to send an alarm to the external apparatus via the communication line if a new reception of the absence information is received by the receiver unit after the instruction unit provides the delivery instruction for delivery of the new expendable, and if the history information is present in the second storage unit, and (ii) not to send the alarm to the external apparatus if a new reception of the absence information is received by the receiver unit, and if the history information is absent in the second storage unit.

BRIEF DESCRIPTION OF THE DRAWINGS

FIG. 6 is a flow chart showing the process sequence for an event generated in a device monitor server 203a;

FIG. 8 is a view showing an example of message format exchanged between the device center server 210 and the device monitor server 203a;

FIG. 9 is a block diagram showing the configuration of a software module of a remote site management system embodying the present invention;

FIG. 10 is a flow chart showing the sequence of downloading of set value to a device, to be executed between the base system and the center system;

FIGS. 23, 24 and 25 are views showing examples of database;

FIG. 27 is a view showing an example of an order placing image;

FIG. 29 is a view showing an example of display of an approving image for an electronic bill;

FIG. 30 is a view showing an example of display of a confirming image showing an approval for an electronic bill;

FIG. 31 is a view showing an example of display of a confirming image showing a denial for an electronic bill;

FIGS. 34 and 35 are views showing examples of display of an event monitor image at the center system.

DESCRIPTION OF THE PREFERRED EMBODIMENTS

First Embodiment of Management System

In the following there will be explained the details of a management system of the present invention with reference to accompanying drawings.

<System Configuration>

Figure 1:
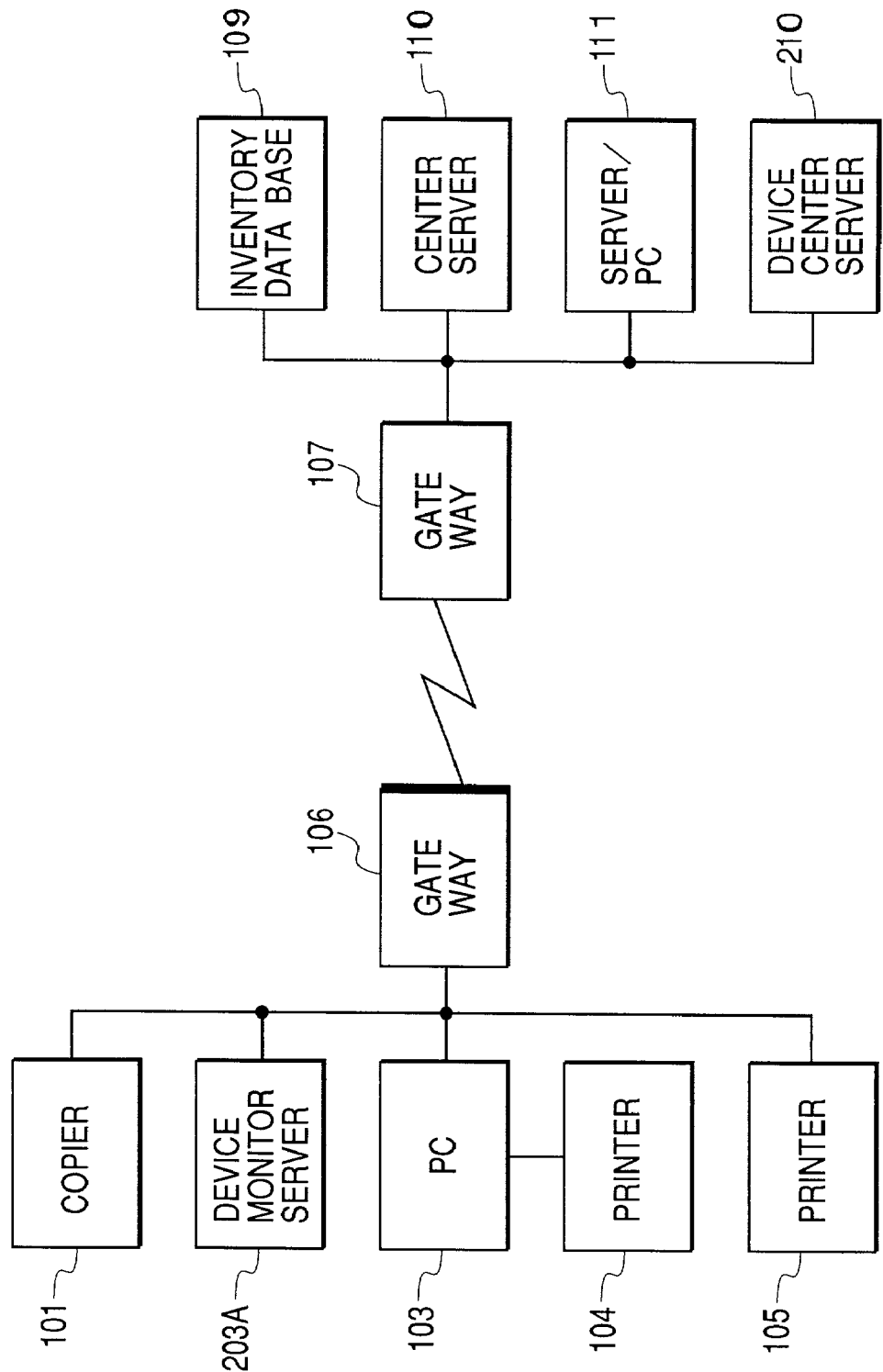
FIG. 1 is a block diagram showing the configuration of a managed site and a managing site.
Figure 20:
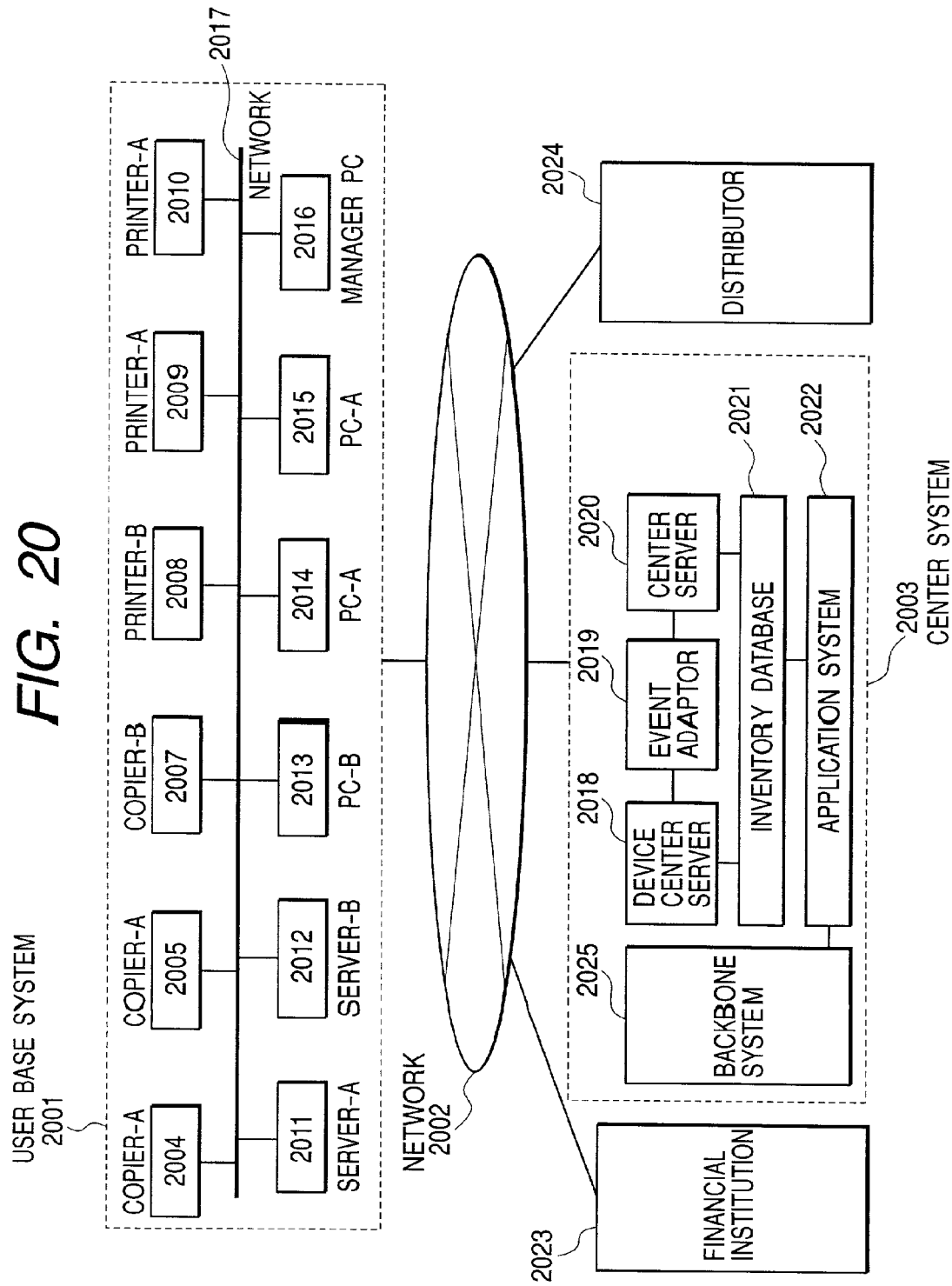
FIG. 20 is a block diagram showing an example of the configuration of a service system.

FIG. 1 is a block diagram showing the configuration of a managed site (corresponding to a user base system 2001 in FIG. 20) and a managing site (corresponding to a center system 2003 in FIG. 20). The managed site includes a PC 103 constituting a general-purpose computer, a device monitor server 203a (information equipment for managing devices connected to a local network for example in an office), and a copying apparatus 101 and printers 105, 104 constituting peripheral devices, all connected by a LAN. The general-purpose computer includes a personal computer, a server, a gateway, a router and a network itself, and the peripheral device includes a copying apparatus, a printer, a scanner, a facsimile, a compound equipment etc. The PC 103 can execute a PC monitor client module to be explained later for managing the general-purpose computer, and can also manage the general-purpose computer devices connected to the local network for example in an office. Also the device monitor server 203a and the PC monitor client server may be physically separate or unified, or may also be logically separate within a physically same apparatus. Though not illustrated in FIG. 1, there may be provided, on the LAN of the managed site, for example a converting device for converting/adjusting the data format between the device monitor server 203a and the PC monitor client module as components of the present invention.

Also in the managing site, there is constructed a LAN system to which connected are a center server 110 for unified management of the device of the managed site, an inventory database 109 for accumulating management information etc., and a device center server 210 for exclusively managing the peripheral devices in the managed site. To such system, there may also be connected another computer such as a server/PC 111, and a managing application program utilizing the management information may be executed by such computer 111.

Also, though not illustrated in FIG. 1, there may be provided, on the managing site, for example a display device for displaying information from the managed site or a converting device for converting/adjusting the data format between the center server 110 and the device center server as components of the present invention.

There may also be included a service center connected with the managing site through an external network or a LAN and serving to comprehensively managing the managing site.

The managed site and the managing site are mutually connected by gateways 106, 107. The connection may also be made by an ordinary router or a modem. Also in case the PC 103 executes the PC monitor client module, the connection between the PC 103 and the center server 109 may be made independent from the connection between the device monitor server 203a and the device center server 210.

Figure 3:
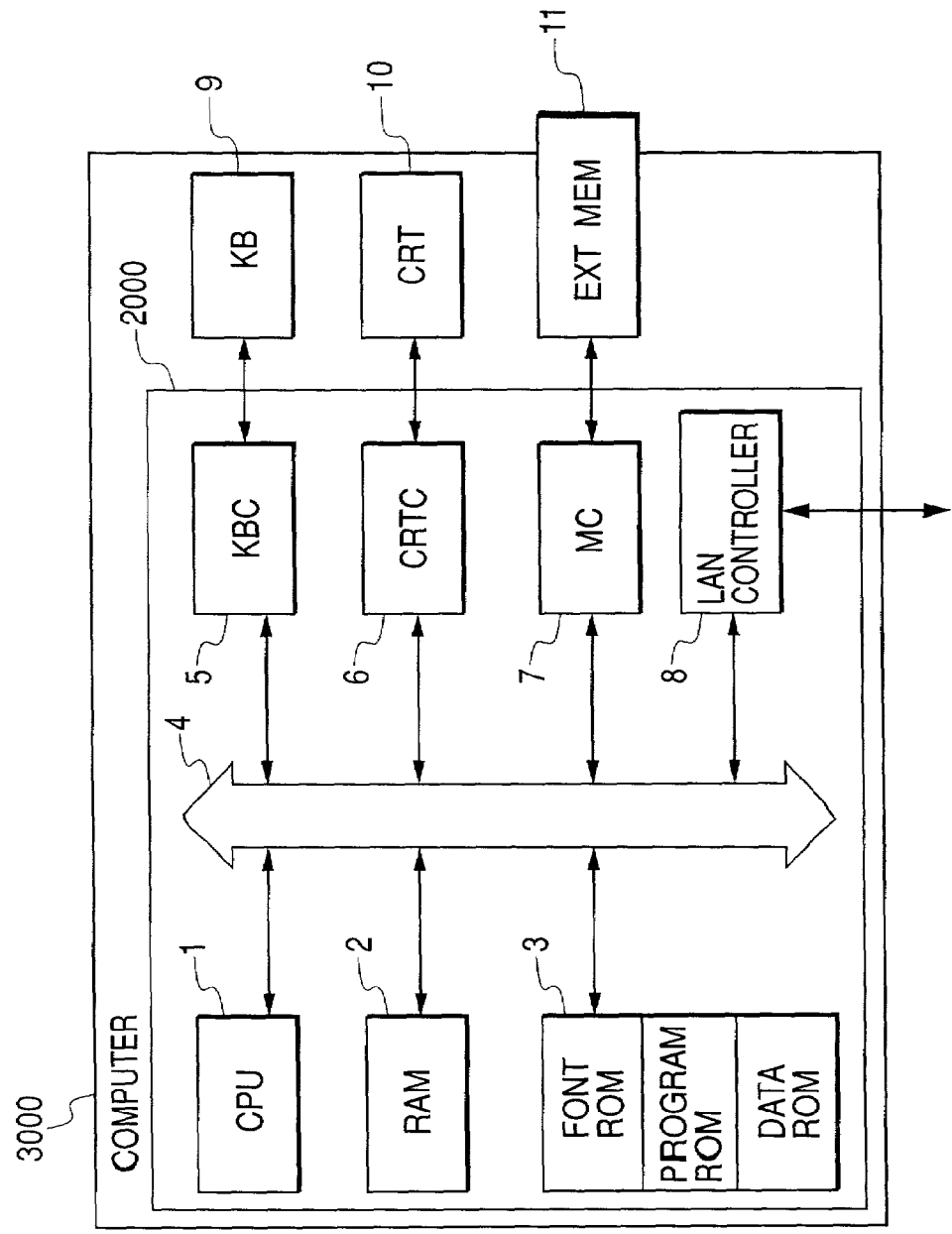
FIG. 3 is a block diagram showing the configuration of a computer constituting each personal computer or server.

FIG. 3 is a block diagram showing the configuration of a PC or a computer constituting a server. Referring to FIG. 3, a computer 3000 is provided with a CPU 1 for executing a procedure of transmitting designated data to the exterior or of data reception from the exterior based on a communication control program stored in a program ROM of a ROM 3, and the CPU 1 comprehensively controls the devices connected to a system bus 4. A RAM 2 serves as a main memory, a work area etc. of the CPU 1. A keyboard controller (KBC) 5 controls the key input from a keyboard 9 or an unrepresented pointing device. A CRT controller (CRTC) 6 controls the display on a CRT display 10. A memory controller (MC) 7 controls access to an external memory 11 such as a hard disk (HD), a floppy disk (FD) etc. storing boot programs, various applications, font data, user files, editing files to be explained later, various databases etc. A LAN control unit 8 is connected to the network and executes a communication control process with other devices connected to the network.

Furthermore, there is provided error detection means not shown in FIG. 3, for the purpose of detecting error states such as a full memory capacity of the own apparatus, a deficiency in the HD capacity, a stopping of the operation process etc. The LAN control unit 8 is also provided with a function of transmitting (informing) the detected error information to the device monitor server 203a or a PC monitor client module 203d.

In case the error information is transmitted to the center server 110a, it is stored and managed in an inventory database 109.

As in the equipment of PC/server type, the equipment of device type is provided with error detection means for detecting error information such as absence of expendables, absence of paper, end of service life of a photosensitive member etc. There is also provided a function similar to that of the LAN control unit 8 thereby being capable of transmitting the detected information to the device monitor server.

Figure 2:
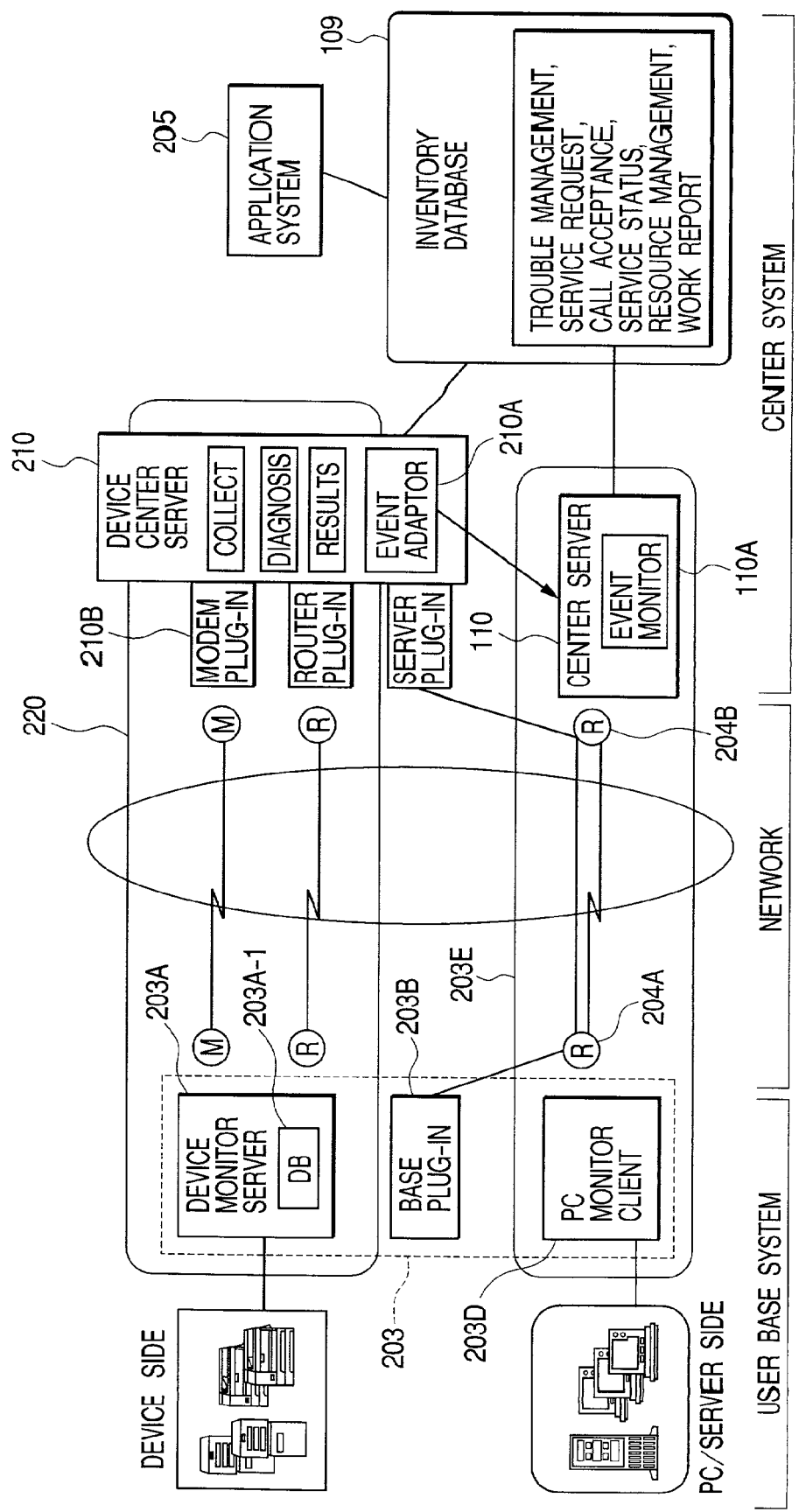
FIG. 2 is a block diagram showing the configuration of a software module of a remote site management system.

FIG. 2 is a block diagram showing the configuration of the software module of the present remote site management system. A user base system (indicating the managed site) is mixedly provided with equipment of device type (peripheral devices such as copying apparatus, printer, compound equipment, scanner, facsimile etc.) and those of PC/server type (general-purpose computer), but the equipment of device type and those of PC/server type are respectively controlled locally by the device monitor server 203a and the PC monitor client 203d. These constituents are collectively called a base side management system 203 (corresponding to the user base system shown in FIG. 2). The device monitor server 203a is provided with a database 203a-1 for accumulating management information.

On the other hand, a center system (indicating the managing site) includes a device center server 210 for exchanging data with the device monitor server 203a, and a center server 110 for exchanging data with the PC monitor client 203d. The management information of the equipment of device type is accumulated in the inventory database 109. Also the management information managed by the center server is accumulated in the inventory database 109. The management information accumulated in the inventory database 109 is utilized for example by an application system 205. The inventory database 109 is only required to be separated logically between the equipment of device type and those of PC/server type but may naturally be separated physically.

The device monitor server 203a and the device center server 210 are connected through a base plug-in module 203b and a server plug-in module for converting the data format and the procedure according to the necessity. Such base plug-in module and server plug-in module enable mutual communication even in case the used OS is different between the base side and the center side. Electrically, the connection is made through a router 204. This channel is physically or logically used in common with a channel connecting the PC monitor client 203d and the center server 110.

The channel connecting the device center server 210 and the device monitor server 230a may not be in common with the channel connecting the monitor client 203d and the center server, and may be connected by a channel through a modem or a router and independent from the channel connecting the management client 203d and the center server 110.

The center server 110 includes an event monitor 110a for monitoring an event issued to the center server 110 and displaying such even on the monitor if such event transmits for example a trouble. By looking at the display, the manager can know the status of the trouble generated in the managed site. The event to the center server 110 may be issued from an event adaptor 210a, the PC monitor client 203d or the application system 205. The center server 110 executes a predetermined process according to the content of the received event. The event can be, for example, an information for a trouble.

The device center server 210 includes an event adaptor module 210a. The event adaptor module 210a has a function of periodically searching the information transmitted from the device monitor server 203a to the device center server 210, and discriminates information on the trouble generated in the peripheral device among the searched information, converts such information into a format (file format, protocol format etc.) processable in the center server 110 and issues an event indicating the generation of trouble to the center server 110. Otherwise, the function of the event adaptor module 210a of conversion into the format processable by the center server may be provided in the center server 110. The event relating to the trouble (trouble event) includes a device showing the trouble, the content thereof, time of generation thereof etc. The presence of the event adaptor 210a in the present system or present apparatus allows unified management of the information specific to the device, such as paper jamming, absence of expendable such as ink/toner, absence of paper, end of service life of the photosensitive member (including photosensitive member unit) and checking of stapling function, obtained by a management software utilizing a protocol/format designed exclusively for the device, by means of a software for monitoring the system/apparatus of another type (general-purpose computer or server in the present embodiment).

Also the information generated in the equipment of PC/server type, managed by the PC monitor client 203d and informed to the center server 110 includes for example the use rate of CPU, usable number of bytes of the memory, percentage of use of the page file, and empty area of the logical disk (empty area of HD), and such information is managed as the information specific to the equipment of PC/server type obtained by a management software utilizing the protocol/format assumed exclusively for the equipment of PC/server type. In the equipment of PC/server type, for example the HD is managed as an expendable.

In response to such information, the event monitor 110a displays the device showing such trouble, content thereof, time of generation thereof etc. as an addition to an event list. The display is for example achieved by displaying an event in a line, thereby showing a time-sequential list of the events. In FIG. 2, the event monitor 110a is included in the center server 110, but it may be connected from the center server 110 to the exterior for example through a network, in order to enable collective management of the equipment of the device and PC/server types from the device center server 210 or from the application system 205.

It is to be noted that the event monitor 110a can call attention of the manager by displaying any trouble event regardless of the origin of such trouble. More specifically, the event monitor 110a can display the trouble event in the general-purpose computer, issued from the PC monitor client 203d and the trouble event in the peripheral device, issued from the device monitor server 203a through the event adaptor 210a of the device center server 210, in an event list on a same image for example time-sequentially.

Further, though not illustrated in FIGS. 1 and 2, there exists organization (web server) such as a financing organization or a distribution organization in the network between the user base system and the center system, as will be explained later in more details.

In the following there will be explained, with reference to FIG. 4, the data exchange procedure between the device center server 210 and the device monitor server 203a, by three examples, i.e. (1) downloading of set value from the device center server 210 to a device, (2) uploading of log data from the device monitor server 203a to the device center server 210, and (3) request for counter data from the device center server 210 to the device monitor server 203a. At first there will be briefly explained the data format.

FIG. 8 shows an example of the format of a message exchanged between the device center server 210 and the device monitor server 203a. A message includes a flag field, a data type field, a job ID field, a return value field, a data length field, and a data field. The flag field includes a bit group indicating communication means and a bit indicating whether the message is the last frame of data.

The data type field indicates that the data are, for example, approval requesting data (to be sent at the head of a session), set value data to be downloaded, a device information request to be explained later, an event information, or a log process request. For example, in a trouble information, event information is indicated in the data type field and the specific content of the event is indicated in the data field.

The job ID field indicates the type of the session, including the parameter setting, acquisition of device information, event information etc. The data length field indicates the length of the ensuing data, and the data field stores data of the length indicated in the data length field. For the set value downloading or the log data process request, corresponding data are placed in the data field. Also in case of the counter uploading, device information is placed in the data field of a response to the device information request.

In the following sequence, the device center server 210 and the device monitor server 203a execute the process by exchanging such message. In the following description, "event" means a message for transmitting generation of an event.

<Procedure of Set Value Downloading>

Figure 4:
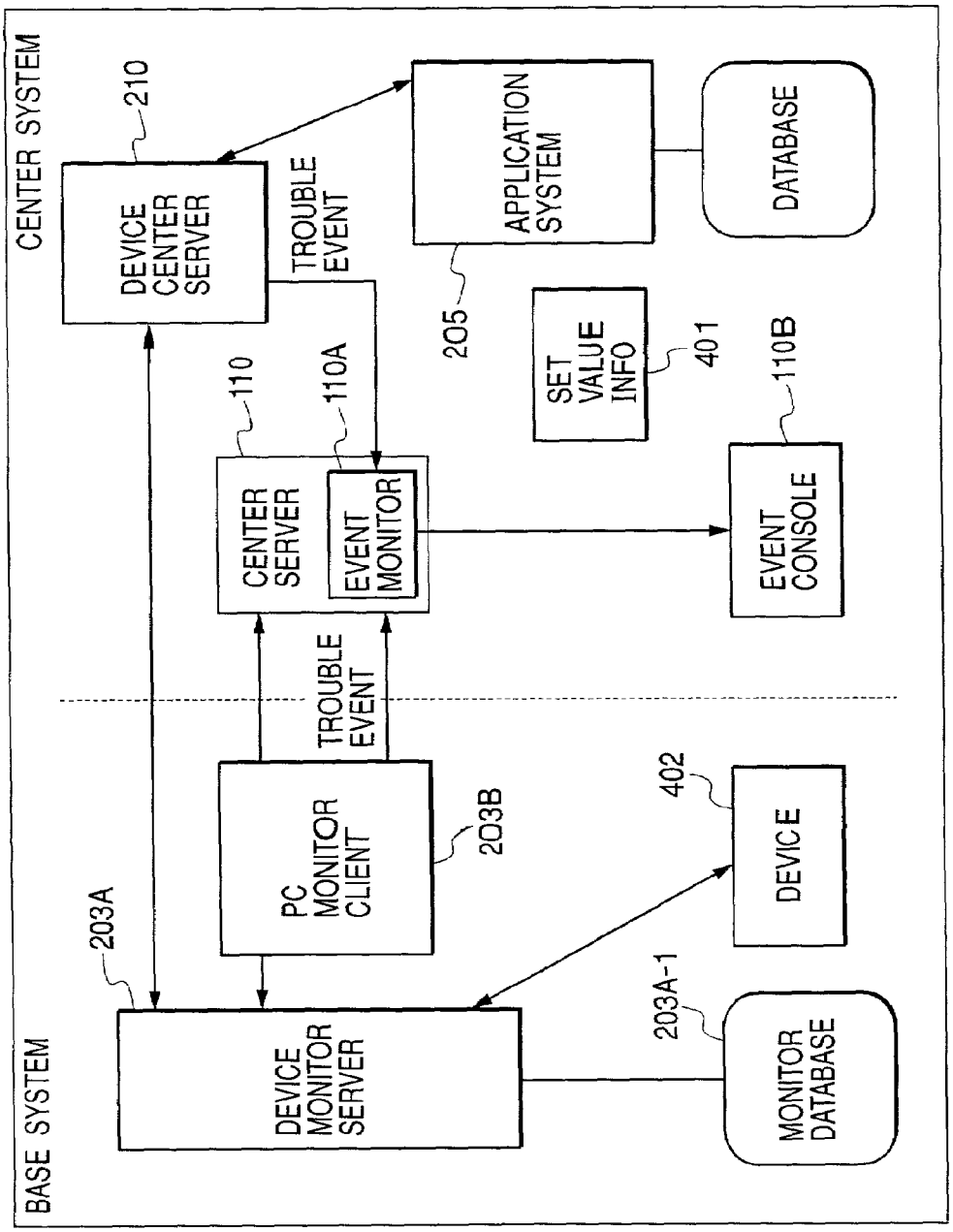
FIG. 4 is a block diagram showing the data exchange sequence between a base system and a center system.

FIG. 4 is a block diagram showing the data exchange sequence between the base system and the center system.

The downloading of a set value is executed in the following manner:

(1) In the application system 205, there are manually entered the designation of a device for setting, the IP address of the device, the threshold set value for the alarm information for an error or the like of the device to the base device server, thereby preparing a set value information file 401;
(2) The application system 205 establishes a session with the device center server 210 and transmits the set value data contained in the set value information file 401;
(3) Receiving the set value data, the device center server 210 establishes a session with the device monitor server 203a and transmits thereto the set value data;
(4) Receiving the set value data, the device center server 210 sends the set value to the device. This operation is executed in a procedure determined for each device;
(5) When the device setting is completed, the device monitor server 210 informs the device center server 210 of the end of setting;
(6) The device center server 210 informs the application system 205 of the end of setting.

Thereafter the application system 205 releases the session with the device center server 210, and the device center server 210 releases the session with the device monitor server 203a.

In this manner the device set information can be downloaded to the device 402 by the direct communication between the device monitor server 203a and the device center server 210.

The trouble is processed in the following manner:
(7) In case the PC monitor client 203d detects any trouble in the server or in the PC and issues a trouble event, such event is directly issued to the center server 110;
(8) Also in case the device monitor server 203a detects the aforementioned trouble in the device 402, the information of such trouble is transmitted to the device center server 210;
(9) Receiving the information of the trouble in the device 402, the device center server 210 in response issues an event informing the generation of trouble to the center server 110. The event adaptor 201a in FIG. 2 is included in the device center server 210 shown in FIG. 4, and the trouble event shown in FIG. 4 is issued from the event adaptor 201a;
(10) As the event is a trouble event, the event monitor 110a displays the trouble information on an event console, thereby renewing the event list.

As explained in the foregoing, any event informing the trouble passes through the center server 110 regardless whether the trouble is generated in any device or any general-purpose computer in the managed site, so that the manager can monitor the information of all the devices and the general-purpose computer in the managed site by merely watching the event console of the center server. The information displayed on the event console may also be printed or displayed on a portable terminal owned by the service personnel. The printed information may be mailed to a managed person and the information displayed on the portable terminal of the service personnel may be utilized for dispatching thereof.

It is also conceivable, in the present system, to transmit the data displayed on the console to the server of the managed site, utilizing an information communication tool such as e-mail, in the form of statistical data indicating for example time and frequency of errors. For example there can be conceived a configuration in which a file representing statistical data is downloaded or memorized in the database of the device monitor server 203a by the communication sequence explained above and such memorized statistical data are observed by designating the URL in an application such as the web browser on the display of the personal computer of the manager. The present invention further allows to a person of the managed site to observe the statistical data by uploading such statistical data from a service center such as the application system 205 to an external server present on the internet. In this manner, the unified management information for the devices and the general-purpose computer/server may be utilized in various forms.

In the foregoing, there has been explained the display of the trouble in the devices on the event console 110b through the event monitor 110a shown in FIG. 4, but a feature of the present invention lies in a fact that all the trouble information generated in the devices are not displayed on the event console 110b. More specifically, the present system is provided with a function of discriminating whether or not to transmit the information to the device center server 210 depending on the level of the trouble in the devices.

The device monitor server 203a does not inform the device center server 210 of the error such as a door open error for example in case of a door open error in the copying apparatus or an error that can be recovered by resetting with the power on/off function of the device. On the other hand, even among the information informed to the center server, there is not executed a service personnel call or the like for an error that can be coped with by the customer, for example an error not affecting the current operation such as a temperature increase in the device or a jamming error.

The database for the discriminating function whether or not to inform the center server of the trouble may be stored in any of the equipment of the device type such as the monitor database 203a-1 or the device 402, in order to discriminate whether or not to inform the information from the device side to the center side.

Also the functions of the present invention can be attained by storing the database for the discriminating function whether or not to display the trouble information, informed to the center server 110, on the event console 110b or the database for the discriminating function whether or not to contact the service personnel in any of an application system 209, the inventory database 109 and the center server 110 of the center server side.

The present system has such filtering function associated with the transmission of information, thereby enabling reduction of the traffic amount between the base and the center, and also enabling the manager at the center to clearly and easily recognize the important error information.

<Procedure of Counter Uploading>

The uploading of the counter value, namely the collection of the device information is executed in the following manner. The counter value for example means a value indicating the number of printed pages in the copying apparatus or the printer, or a value of a mode counter indicating the amount of use of various modes of the device, and is used as the basis for calculating the maintenance charge. The uploading of such value in response to a request from the center system enables fetching of the device information including the counter value, from a remote location. As the counter uploading is executed in response to a request from an application, the center system (managing site) becomes the initiator in the following manner:

(1) The application system 205 establishes a session and transmits a device information request to the device center server 210. The device information request includes for example information designating an object device in the base system;

(2) Receiving the device information request, the device center server 210 establishes a session with the device monitor server 203a and transmits a device information request thereto;

(3) Receiving the device information request, the device monitor server 203a acquires the device information from the designated device. This operation is executed according to a procedure determined for each device, and information determined for each device or designated information is acquired;

(4) Acquiring the device information, the device monitor server 203a transmits a device information response including the acquired device information to the device center server 210;

(5) The device center server 210 transmits the device information response to the application system 205.

Thereafter the application system 205 releases the session with the device center server 210, and the device center server 210 releases the session with the device monitor server 203a.

In this manner the device information can be acquired by the direct communication between the device monitor server 203a and the device center server 210.

The trouble is handled in the same manner as in the set value downloading.

<Procedure of Log Data Uploading>

The uploading of the log data is executed in the following manner. The log data mean the history of warning or retry generated for example in a peripheral device, and are spontaneously transmitted to the managing site in case a certain abnormal situation not reaching the level of an error, such as repeated warnings, is being generated. Consequently, in the uploading of the log data, in contrast to the uploading of the counter value, the managed site (base system) becomes the initiator as shown in the following:

(1) The device monitor server 203a collects the log of a device. In case the amount of such log exceeds a predetermined value or the frequency of alarm exceeds a predetermined rate, the device monitor server 203a initiates the uploading of the log data;

(2) At first the device monitor server 203a establishes a session and transmits a log data process request including log data to the device center server 210;

(3) Receiving the log data process request, the device monitor server 203a establishes a session with the device center server 210 and transmits the log data process request thereto;

(4) Receiving the log data process request, the device center server 210 establishes a session with the application system 205 and sends the log data process request to the application system 205 which processes the log data;

(5) Receiving the log data process request, the application system 205 processes the log data received therewith and transmits a log data process response to the device center server 210;

(6) The device center server 210 transmits the log data process response to the device monitor server 203a;

(7) The device monitor server 203a releases the session with the device center server 210 and executes a post process. If the log data response indicates the proper completion of the log data process, the post process executes erasure of the log data.

Thereafter the device center server 210 releases the session with the application system 205.

In this manner the uploading of the log data can be executed by the direct communication between the device monitor server 203a and the device center server 210.

The trouble is handled in the same manner as in the downloading of the set value.

<Process Sequence by Device Center Server>

Figure 5:
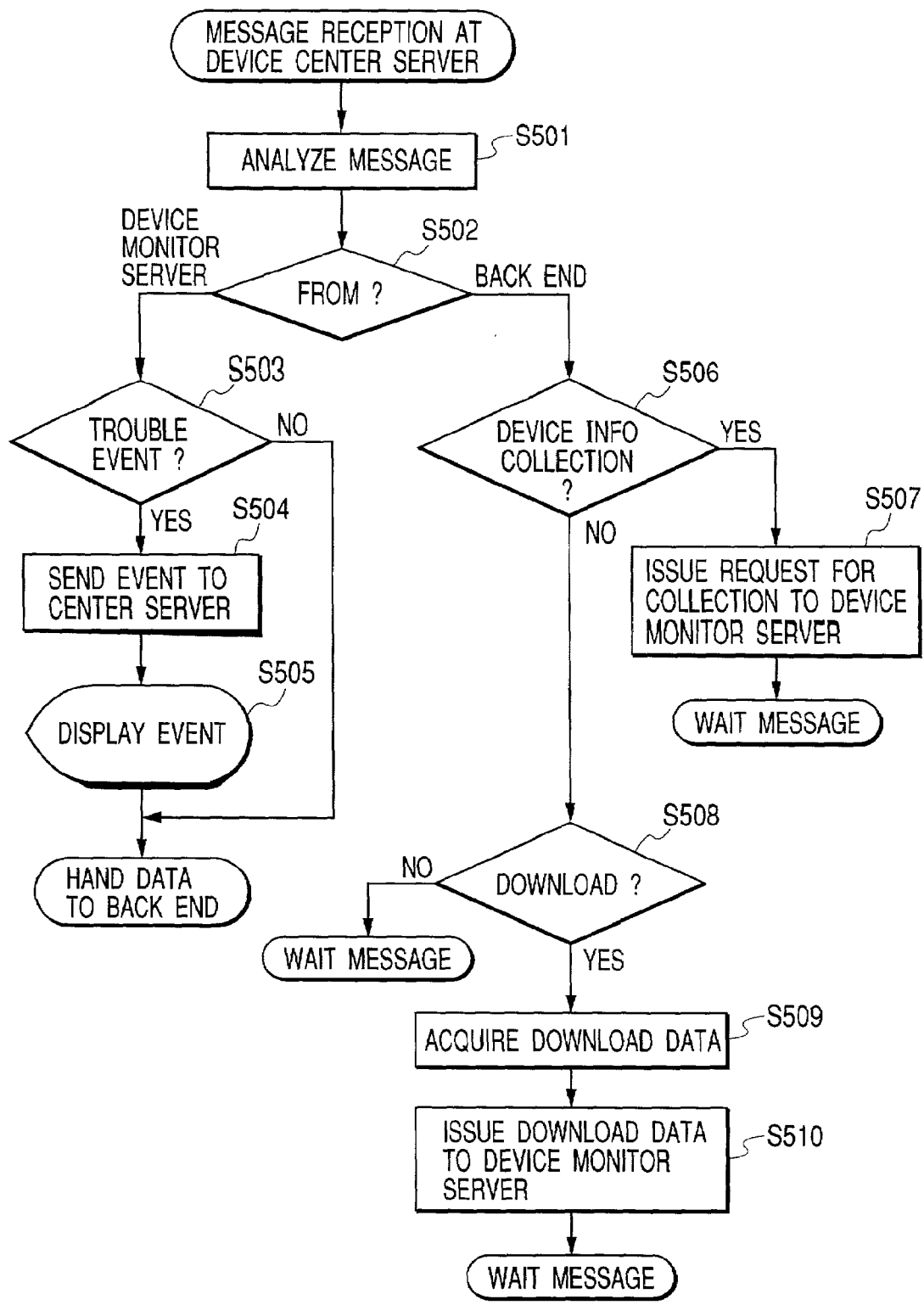
FIG. 5 is a flow chart showing the process sequence at message reception in a device center server.

In the following the process sequences in the device center server 210 and in the device monitor server 203a will be briefly explained. FIG. 5 is a flow chart showing the process sequence of the device center server at the message reception. The message is received not only from the device monitor server but also from the application system 205. The format of the message may be different from that shown in FIG. 8. The message is so constructed as to enable identification of the source of transmission, or the executed process is made different according to the source of transmission. The former is adopted in the present embodiment.

The process shown in FIG. 5 is initiated in response to the reception of a message. At first the received message is analyzed (step S501) to identify the source of issuance thereof (S502). The source of issuance may be indicated for example by the addition of an address or the like, but can also be identified from the content thereof. For example, in case of a log process request, the source of issuance is the device monitor server, and the source of issuance of a set value downloading request is the application system (represented as backend in the flow chart).

If the source of issuance is the device monitor server 203a, there is discriminated whether the message is a trouble event (S503), and, if so, it is converted into a processable format and transferred to the center server 110 (S504). The center server 110 reads and displays the location, content, time etc. of the trouble from the data contained in the message (S505). If not a trouble event, the data are transferred to the backend to execute a process matching the message, whereupon the sequence enters a waiting state for the message. The process transferred to the backend includes, for example, a log data process request and collected device information.

On the other hand, if the source of issuance is the backend, namely the application system, there is discriminated whether the message is a collection request for the device information (S506). If so, a device information collection request is issued to the device monitor server 203a, whereupon the sequence enters a waiting state for the message.

If not a device information collection request, there is discriminated whether the message is a download request for the set value (S508). If so, the received download information is acquired (S509) and is issued to the device monitor server 203a (S510).

<Process Sequence by Device Monitor Server>

Figure 6:
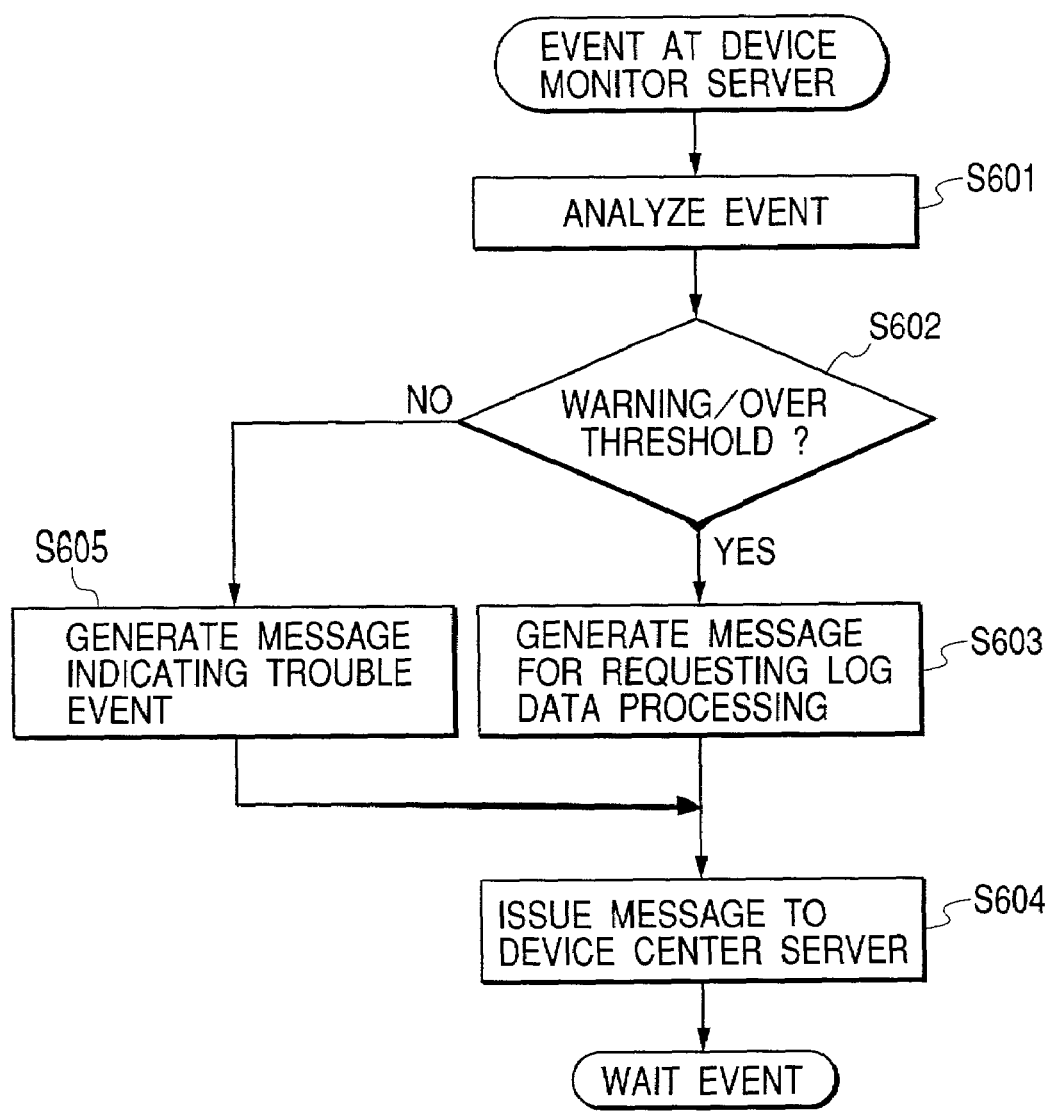

FIG. 6 is a flow chart showing the process sequence for an event generated in the device monitor server 203a.

In case any event is generated, the generated event is analyzed (step S601), and, if it is a warning from a device and exceeds a predetermined threshold value (Yes in a step S602), the log data accumulated up to this point are acquired to prepare a message for requesting log data process (S602) and a log process request is issued to the device center server 210. If the event does not exceed the threshold value, it is accumulated in the log.

On the other hand, if the event is not a warning, it is regarded as an error in the present embodiment and a message indicating a trouble event is prepared (S605) and is transmitted to the device center server 210 (S604).

The trouble event in the device monitor server 203a also includes the absence of expendables such as toner, ink, paper etc. used in each device, and, in such case, the present invention is also capable of executing a program process for inventory monitoring in addition to the processes of preparing the event message (S605) and memorizing the log for absence of expendable. Such process is similarly executed also in the trouble information to the PC client module 203d of PC/server type, and trouble information between the device and the device monitor server in a second embodiment. The details of such process will be explained later.

Figure 7:
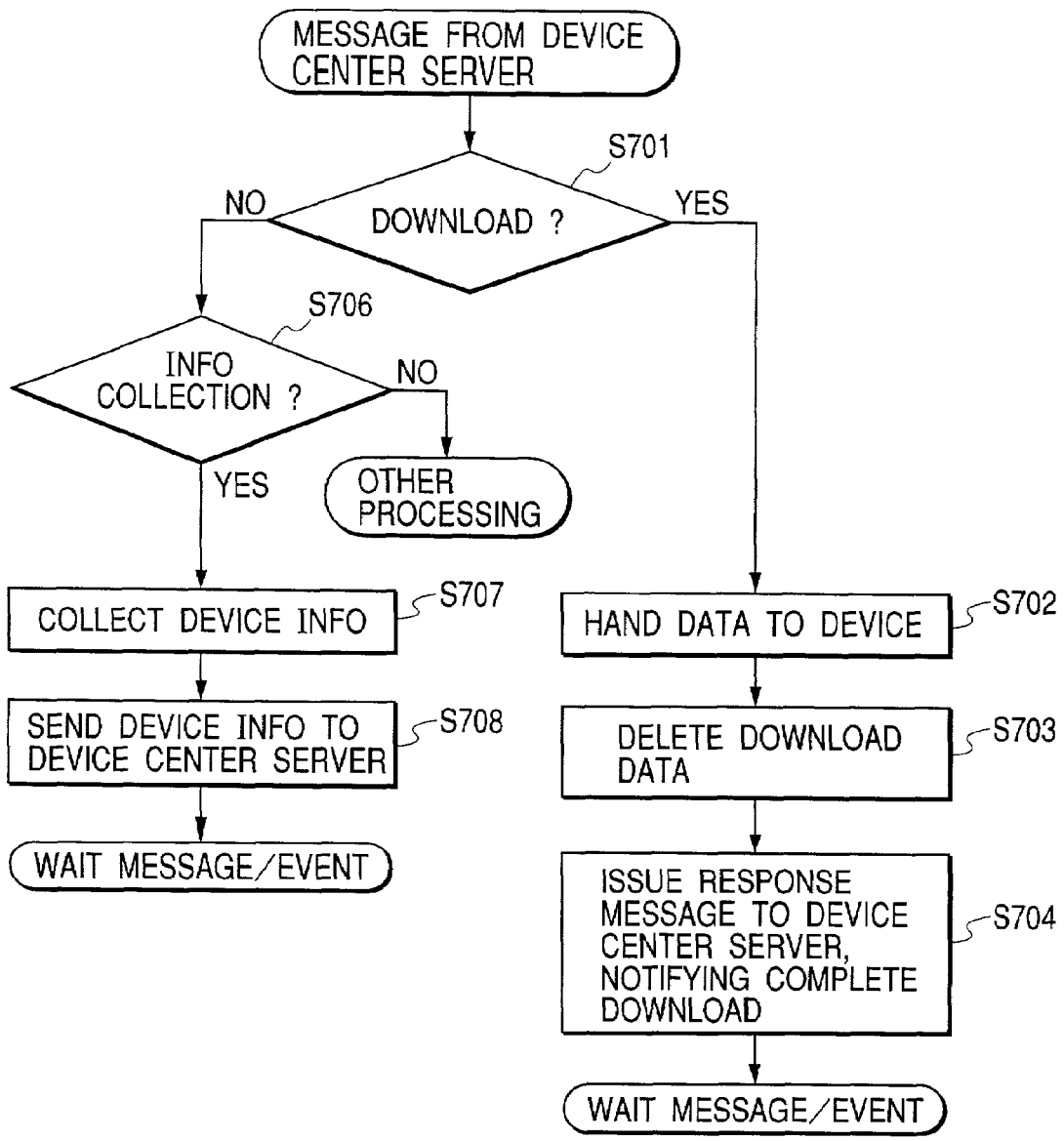
FIG. 7 is a flow chart showing the sequence of message reception of the device monitor server 203a from a device center server 210.

FIG. 7 is a flow chart showing of the process of the device monitor server 203a for receiving a message from the device center server 210.

At first there is discriminated whether the received message is a set value download request (step S701). If so, setting is executed between the device monitor server 203a and the device based on the received set value data (S702). The base plug-in 203b deletes such data (S703) and issues a response message indicating the completion of downloading to the device center server 210 (S704). The base plug-in 203b is required to be connected to the device monitor server 203a only logically and may be physically separated if such logic connection is made.

If the message is not a downloading, there is discriminated whether it is a device information collection request (S706), and, if so, the information is collected from the designated device (S707) and the device information is transmitted to the device center server (S708).

The above-described procedure allows unified management in the managing site on the trouble event in the managing system for the general-purpose computer and in the managing system for the peripheral devices as integrated information. Also the present invention is not limited to a case in which the managing information for the device is adapted to the managing software of the PC/server, but is also applicable to a case in which the managing information of the PC/server is adapted to the managing software of the device. For example the event adaptor 210a shown in FIG. 2 may be provided in the center server 110 thereby informing the device center server 210 of the event generated in the device server. Also in still another embodiment, there may be provided an event adaptor 210a for the equipment of device type corresponding to the device center server and an event adaptor 210a for the equipment of PC/server type corresponding to the center server 110, and the format information (first format) specific to the equipment of device type collected by the device center server 210 and the format (second format) specific to the equipment of PC/server type collected by the center server 110 may be managed in unified manner in a common format (third format) other than the format specific to the equipment of device type and that specific to the equipment of PC/server type. It is thus rendered possible to manage the equipment of device type and the equipment of PC/server type in respective specific formats (formats corresponding to the management systems) and to manage both in unified manner from a remote location.

It is also possible to use a same channel for the channel connecting the device monitor server 203a and the device center server 201 and for the channel connecting the PC monitor client 203d and the center server 110 and to utilize a router etc. in common, thereby reducing the number of channels. Such configuration is effective in case an exclusive line is used for the channel.

(Second Embodiment of Management System)

In the following there will be explained a second management system of the present invention with reference to the accompanying drawings. The system of the present embodiment is different from the first management system in the configuration of the logic channel between the managing site and the managed site. In the first management system, though it is possible to use the communication line in common, the channel connecting the device monitor server 203a and the device center server 210 and the channel connecting the PC monitor client 203d and the center server 110 are mutually independent logically. In case the device center server 210 receives a trouble event from the device monitor server 203a, an event informing the generation of trouble is transmitted to the center server 110 thereby achieving unified management of the trouble event in the event monitor.

On the other hand, the present system dispenses with the device center server 210 and the channel connecting the device monitor server 203a and the device center server 201. The device center server is replaced by a device information processing module 901, provided in the center server 110 (separately illustrated), for processing the information of the devices received by the center server 110. In such configuration, in case there are employed a PC monitor client 203d and a center server 110 which are commercially available, the message of the devices is also supplied to the channel established therebetween. In this manner, there is obtained, in addition to the advantage of the first embodiment allowing to use the channel in common, an advantage not requiring an independent communication channel for the information of the devices, and also not requiring the device center server.

<System Configuration>

FIG. 9 is a block diagram showing the configuration of the software module in the management system of the present embodiment. A user base system (indicating the managed site) is provided in mixed manner with equipment of device type (peripheral devices such as printer, copying apparatus, scanner, facsimile, compound device etc.) and equipment of PC/server type (general-purpose computer), and the equipment of PC/server type is managed by the PC monitor client 203d as in the first embodiment of the management system.

Also the configuration of the equipment of PC/server type and that of device type is similar to that explained in the first embodiment and will not, therefore, be explained further.

The center system (indicating the managing site) includes a device information processing module 901 for data exchange with the device monitor server 203a, and a center server 110 for data exchange with the PC monitor client 203d. The management information of the equipment of device type and PPC/server type is accumulated in the inventory database 109. There is shown only one database in FIG. 9, but it is required to be separated into databases of device type and PC/server type. This information is utilized for example by the application system 205, the center server 110 etc. as in the first embodiment.

The managing site and the managed site are connected by a channel which is connected by routers 204. The PC monitor client 203d and the center server 110 can be realized by a commercially available site management system. All the messages are provided by such commercially available management system, and are transmitted and received by the channel constituted by the PC monitor client 203d and the center server 110. In FIG. 9, the device information processing module 901 is independently provided (corresponding to the device center server 210 in FIG. 2), but such function may also be incorporated in the center server 110.

The device monitor server 203a and the PC monitor client 203d are connected through a base plug-in module 203b for converting the data format and the protocol whenever required. Thus, the base plug-in module 203b has a function of converting the information of the device monitor server into the format (or protocol) of the PC monitor client 203a and an inverse converting function. It is also possible to provide the plug-in of center side (corresponding to the server plug-in in FIG. 2) for data exchange between the center server 110 and the device processing module 901 with functions equivalent to those of the base plug-in module 203b.

The base plug-in module 203b has functions, as will be explained later, of transferring the message from the device monitor server 203a to the PC monitor client 203d for transmission to a designated destination, searching by periodical palling the content of a predetermined data area written by the PC monitor client 203d and transferring, to the device monitor server 203a, any message addressed thereto.

Also the center server 110 transfers the received message, according to the content thereof, to the device information processing module for processing if the content is information relating to the device or to the event monitor 110a, if the message informs generation of an event, for displaying the generated event in the event list in a display form capable of identifying whether the event relates to the device type or the PC/server type. The event of the device type is issued from the device information processing module 901.

As explained in the foregoing, the presence of a plug-in having the format converting function between the device type and the PC/server type allows to utilize the functions of the commercially available management software for the PC/server type and enables exchange of the information of the device type between the base side and the management center side. Also the information specific to the device, that cannot be managed in detail by the commercially available management software for the PC/server type can be processed by the device information processing module after converting the data relating to the content of the device transmitted from the center side, from the format of the PC/server type into the format of the device type. If detailed management is desired for the device information, it is only required to independently develop the device information processing module and the efficiency of development/designing can be improved.

In the following there will be explained, with reference to FIGS. 10 to 12, the message exchange procedure between the base system (managed site) and the center system (managing site), by three examples, i.e. (1) downloading of set value from the device center server 210 to a device, (2) uploading of log data from the device monitor server 203a to the device center server 210, and (3) request for counter data from the device center server 210 to the device monitor server 203a.

<Procedure of Set Value Downloading>

FIG. 10 is a block diagram showing the data exchange sequence between the base system and the center system. The downloading of a set value is executed in the following manner.

At first in the application system 205, the designation of a device to be set and the set value are manually entered to prepare a set value information file 1002:

(1) The application system 205 establishes a session with the center server 110;
(2) The center server 110 activates a distribution module 1001 and prepares a distribution file package 1001a from the set value information file 1002;
(3) The distribution module 1001a transmits the distribution package file to the PC monitor client 203d for storage therein as a work file;
(4) The base plug-in 203b periodically monitors the data file stored by the PC monitor client 203d, and, detecting the preparation of the work file by the PC monitor client, informs the device monitor server of the arrival of the set value and transfers the set value data to the device monitor server 203a. The device monitor server 203a sets the set value in the designated device;
(4-2) The base plug-in 203b informs the center server, through the PC monitor client 203d, of the completion of setting;
(5) The center server 110 causes the distribution module 1001 to delete the distribution package file 1001a;
(6) The center server 110 informs the application system 205 of the completion of setting.

As explained in the foregoing, the set information of the device can be downloaded to the device by transferring the set data to the device monitor server 203a.

A trouble generated in the device type is transmitted, in the same manner as in the above-described sequence (4-2), as a trouble event from the base plug-in 203b to the center server 110 through the PC monitor client 203d. Thus the event informing the trouble is processed by the event monitor 110a of the center server 110 and is displayed in the event list.

<Procedure of Counter Uploading>

Figure 11:
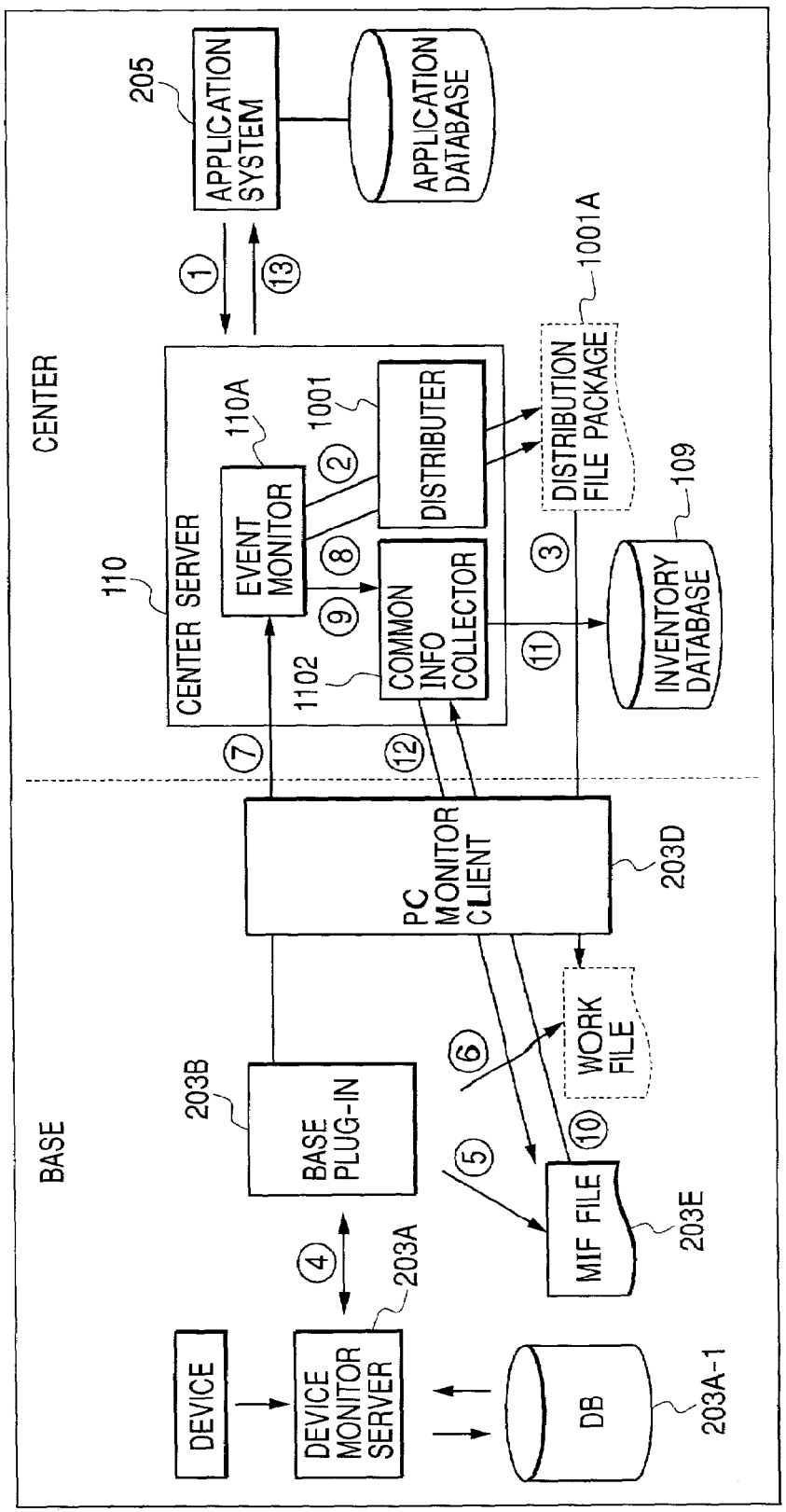
FIG. 11 is a flow chart showing the sequence of uploading of count data, namely of device information collection, to be executed between the base system and the center system.

FIG. 11 is a flow chart showing the procedure of uploading of the count data, namely the device information collection, executed between the base system and the center system. The uploading of the device information is executed in the following manner:

(1) The application system 205 stores the information request command in a file and issues a message (event) initiating the information collection to the center server 110;
(2) The event monitor analyzes the event from the application system 205 and activates the distribution module 1001 thereby preparing a distribution file package 1001*a* for the information request command;

(3) The center server 110 transmits a distribution package, including the prepared information request command, to the PC monitor client 203*d*, which stores the received file as a work file. Such work file constitutes a general-purpose file in the PC/server management system and corresponds to the content of the distribution file package 101*a*;

(4) Upon detecting that the file is stored by the PC monitor server 203*d*, the base plug-in 203*b* calls and transfers the file to the device monitor server 203*a*. In response, the device monitor server 203*a* collects the device information from the designated device and transfers it to the base plug-in 203*d*;

(5) The base plug-in 203*b* stores the received device information as a file 203*e* of a predetermined format. In the present embodiment, such predetermined format is assumed as MIF format, which is a general file format in the information management system;

(6) The base plug-in 203*b* deletes the work file;

(7) The base plug-in prepares an event indicating the preparation of an MIF file and transmits it to the center server 110;

(8) Receiving the event, the center server 110 deletes the distribution file package;

(9) If the event received from the base plug-in 203*b* indicates the completion of proper information collection, the center server 110 also activates a common information collection module 1102 for reading the MIF file prepared by the base plug-in and collecting the device information;

(10) The common information collection module 1102 reads the MIF file 203*e* thereby acquiring the collected device information;

(11) The common information collection module 1102 stores the acquired device information in the inventory database. The inventory database includes databases logically or physically separate for the equipment of device type and that of PC/server type, thereby being capable of flexible process according to the object equipment;

(12) The center server causes the MIF file 203*e* of the base side to be deleted;

(13) Completion of the process is informed to the application.

As explained in the foregoing, the center server 110 can acquire the device information collected by the device monitor server 203*a*.

<Procedure of Log Data Uploading>

Figure 12:
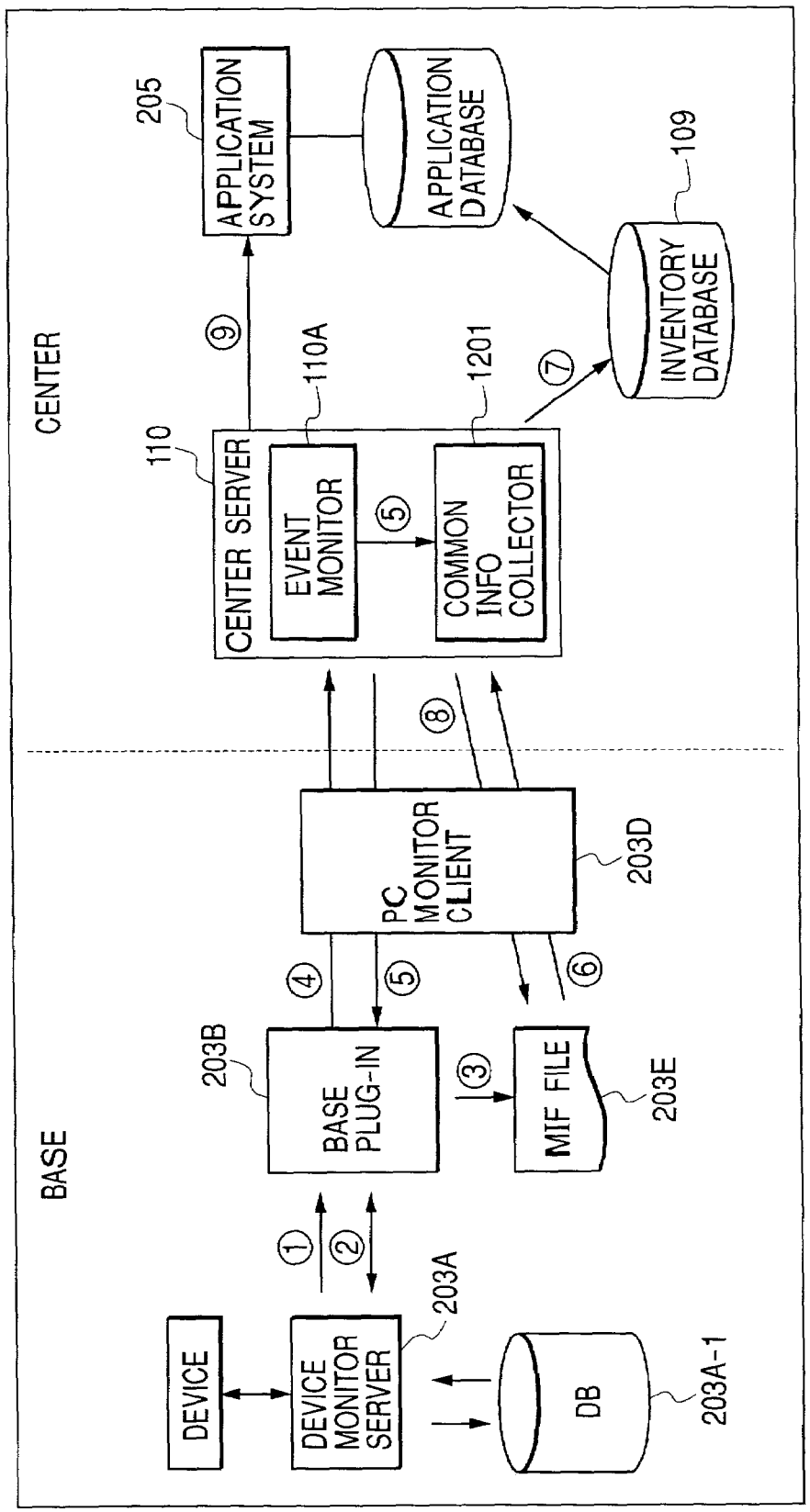
FIG. 12 is a flow chart showing the sequence of uploading of log data from the base system to the center system.

FIG. 12 is a flow chart showing the procedure of log data uploading from the base system to the center system. The uploading of the log data in the present embodiment is executed in the following manner:

(1) The device monitor server 203*a* issues, to the base plug-in 203*b*, an information indicating the detection of an error or a warning and that the number thereof exceeds a threshold value;

(2) The device monitor server 203*a* issues event data of the aforementioned warning to the base plug-in 203*d*;

(3) The base plug-in 203*b* stores the log data as a file 203*e* of MIF format, which is a general file/data format in the information management system as explained in the foregoing;

(4) The base plug-in 203*b* prepares an event indicating the preparation of the MIF file and transmits it to the center server 110;

(5) Receiving the event, the center server 110 activates the common information collection module 1201;

(6) The common information collection module 1102 fetches the MIF file prepared by the base plug-in 203*b* and reads the log file;

(7) The common information collection module 1102 stores the acquired device information in the inventory database 109;

(8) The center server causes the MIF file 203*e* of the base side to be deleted;

(9) Completion of the process is informed to the application.

As explained in the foregoing, the center server 110 can acquire the log data file prepared by the device monitor server 203*a*.

<Process Sequence by Device Center Server>

Figure 13:
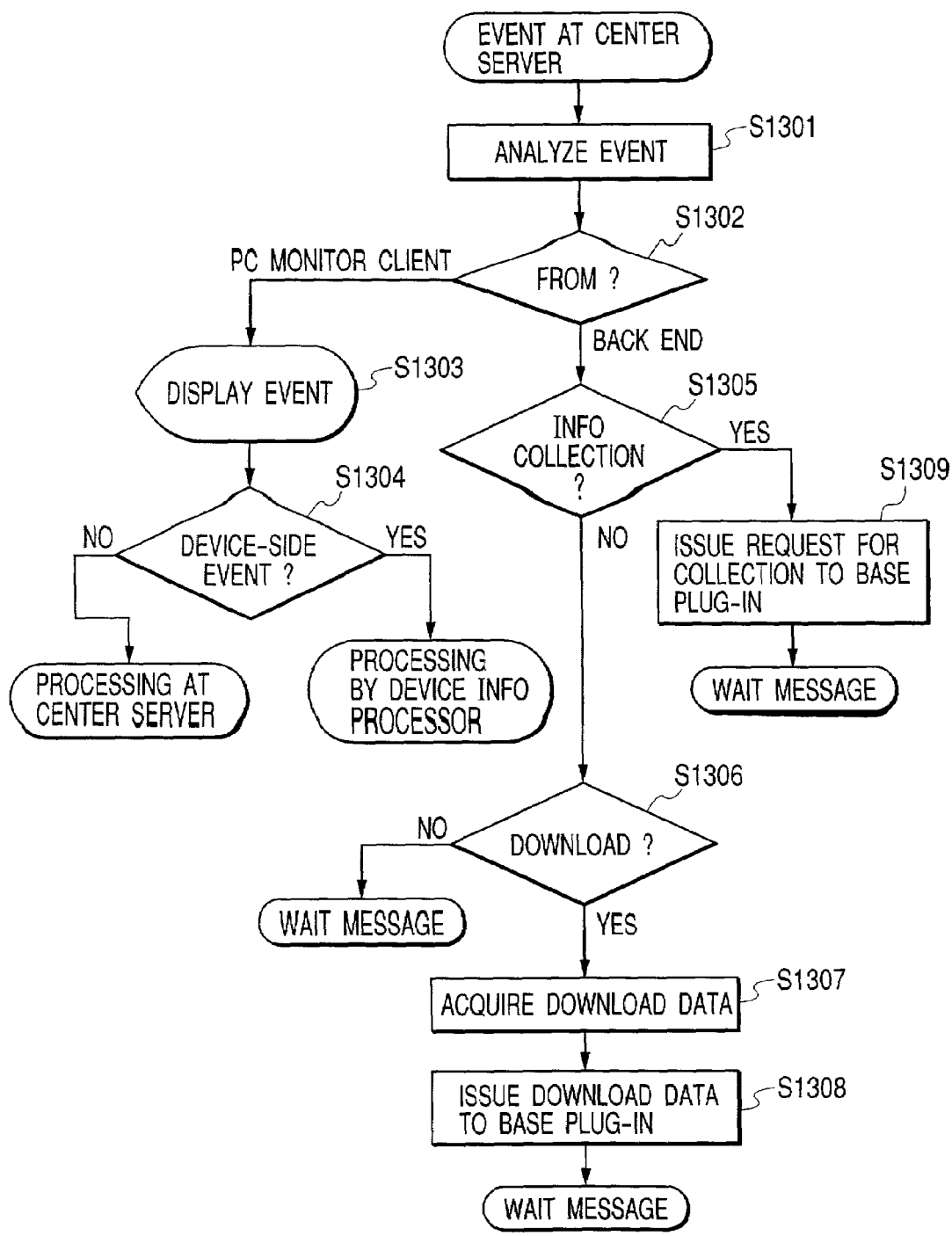
FIG. 13 is a flow chart showing the process sequence at an event reception at the center server 110.

In the following there will be briefly explained the process sequence by the center server 110, the device information collection module 901, the base plug-in 203*b* and the PC monitor client 203*d*. FIG. 13 is a flow chart showing the process sequence of the center server 110 at the event reception. The process shown in FIG. 13 is initiated in response to the reception of an event. In the following description, message and event are not rigorously separated, and the event is used to indicate a message informing the generation of an event.

At first the received event is analyzed (step S1301) to identify the source of issuance (S1302). If the source of issuance is the PC monitor client 203*d*, the event is processed by the event monitor, and, if it is a trouble event, it is displayed in the event list (S1303).

Figure 14:
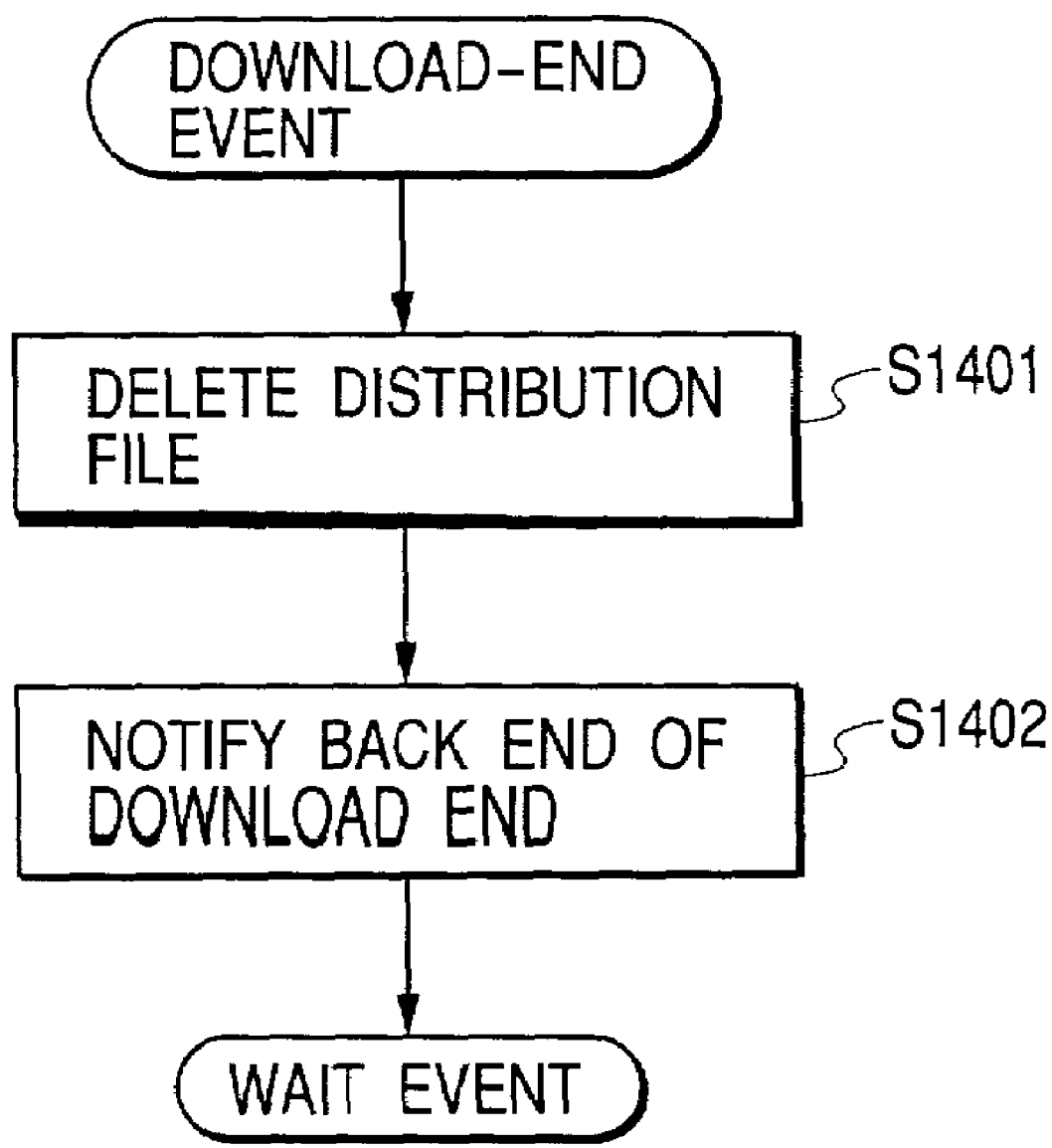
FIG. 14 is a flow chart showing the process sequence for a download ending event by a device information processing module 901.
Figure 15:
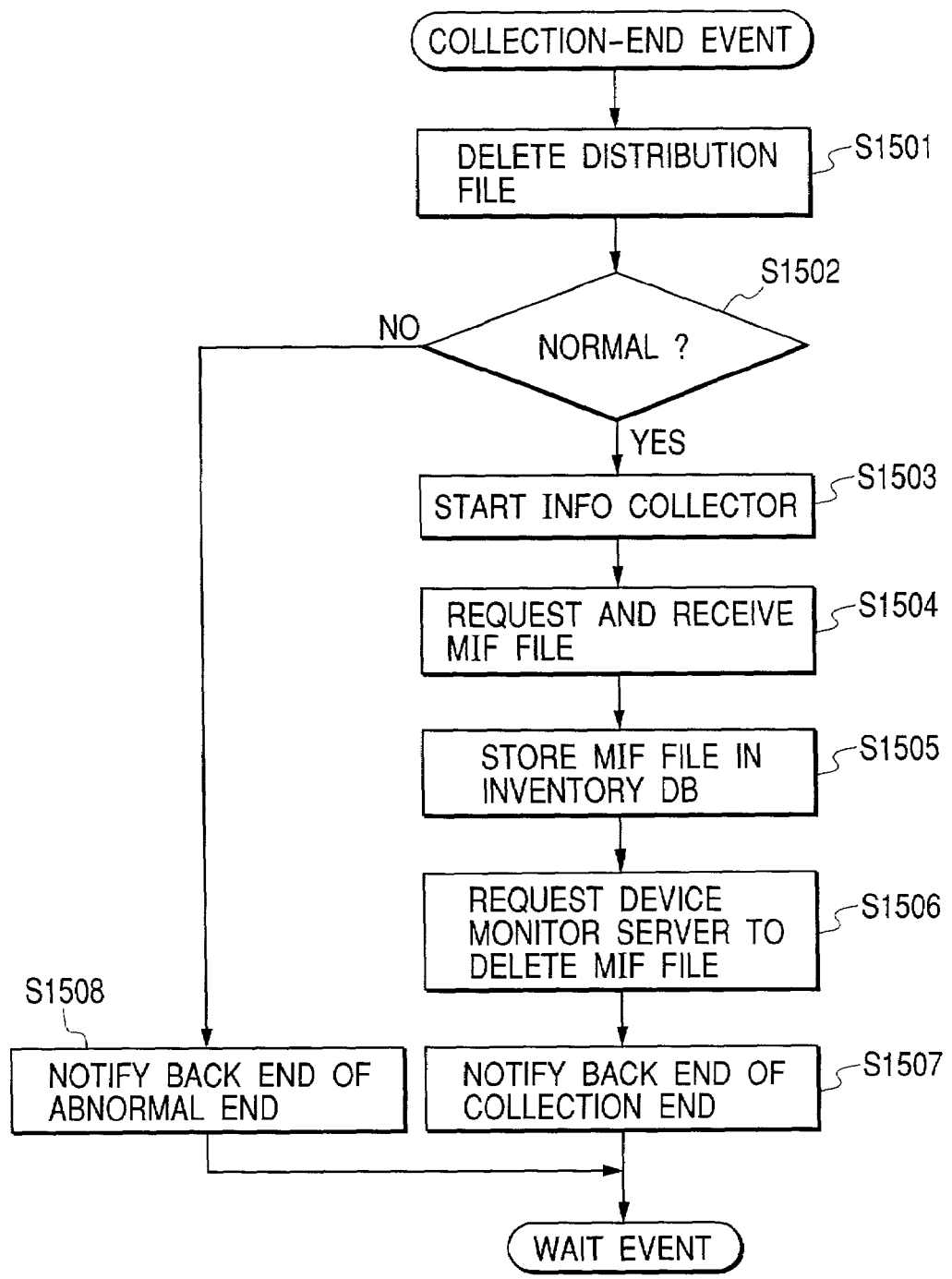
FIG. 15 is a flow chart showing the process sequence for information of device information acquisition (counter uploading) by the device information processing module 901.
Figure 16:
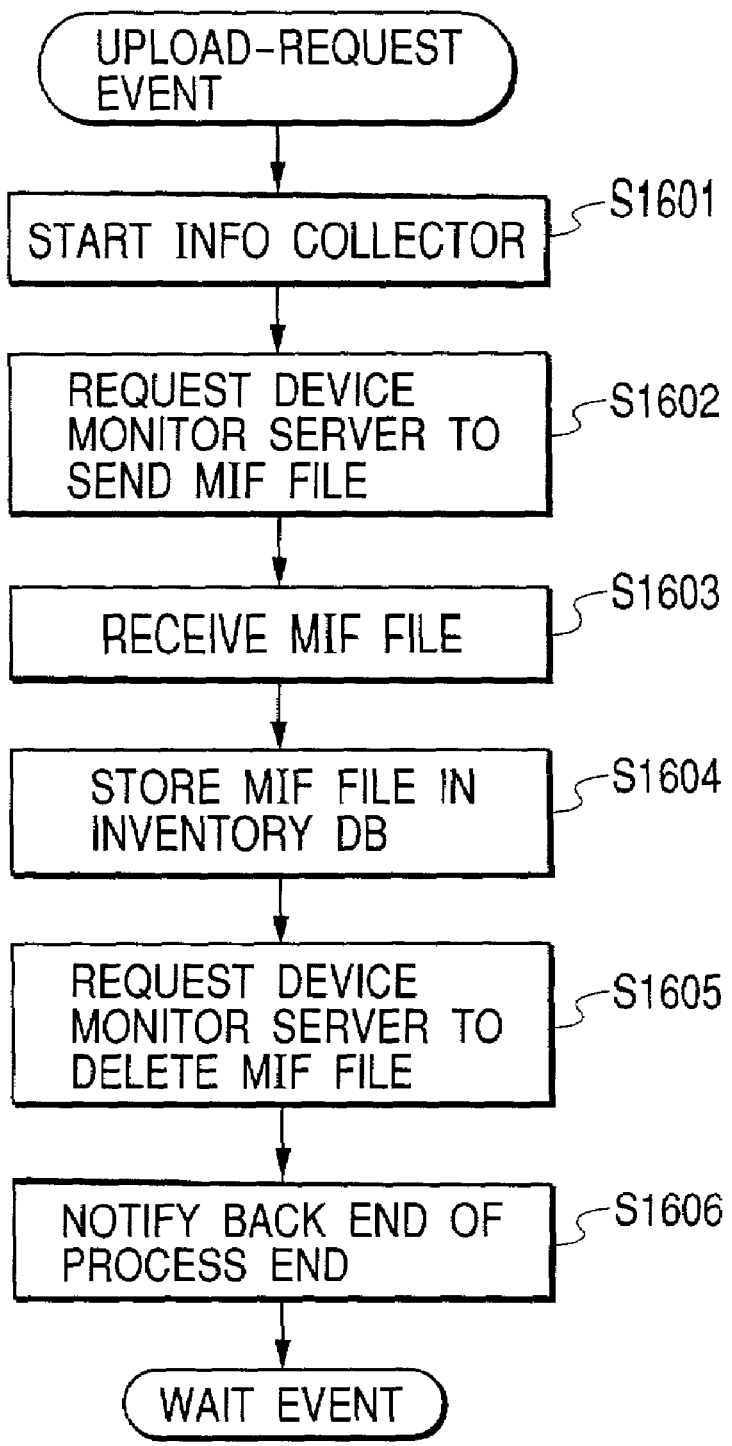
FIG. 16 is a flow chart showing the process sequence for information of log data uploading by the device information processing module 901.

Then there is discriminated whether the event is of the device type, namely issued from the base plug-in 203*b* (S1304), and, if so, each event is processed by the device information processing module. This procedure is shown in FIGS. 14 to 16. If the event is not of the device type, the center server 110 executes a process corresponding to the event.

On the other hand, if the source of issuance of the event is the backend, namely the application system, there is discriminated whether the event is for executing information collection (S1305), and, if so, an information collection request is issued to the base plug-in module 203*b* (S1309). The information collection request is executed by causing the distribution module 1001 to prepare and distribute a distribution file package.

If the event is not an information collection request, there is discriminated whether the event is for requesting downloading (S1306). If not, there is executed a process corresponding to the event, and the sequence enters a waiting state for the event.

If the event is for requesting downloading, the data to be downloaded are acquired from the backend (S1307) and are distributed to the base plug-in 203*b* (S1308).

<Process Sequence by Device Information Processing Module>

The event identified as of the device type in the step S1304 in FIG. 13 is further analyzed into (1) an event indicating the end of downloading, (2) an event informing the end of device information collection, or (3) an event requesting log data uploading. These cases respectively correspond to the flow charts shown in FIGS. 14 to 16.

(End of Downloading)

FIG. 14 is a flow chart showing the process sequence for a downloading end event by the device information processing module 901. When the end of downloading is informed, at first the distribution file package 1001a is deleted (step S1401), and the end of downloading is informed to the backend (S1402).

(Acquisition of Device Information)

FIG. 15 is a flow chart showing the process sequence for information of the device information acquisition (counter uploading) by the device information processing module 901.

At first the distribution file package 1001a prepared for the information collection request is deleted (step S1501). Then, if the data acquisition is executed properly (S1502), the information collection module 1101 is activated (S1503) to request, to the device monitor server 203a, the MIF file storing the device information, and the MIF file is received in response (S1504).

Then the received file is stored in the inventory database 109 (S15O5), and the deletion of the MIF file is requested to the device management server 203a (S1506). Finally, the end of the device information collection is informed to the backend (S1507).

On the other hand, if the step S1502 identifies that the data acquisition is not properly executed, such fact is informed to the backend (S1508).

As explained in the foregoing, the device information prepared as the MIF file is acquired from the device management server 203a.

(Uploading of Log Data)

FIG. 16 is a flow chart showing the process sequence for the information of log data uploading, by the device information processing module 901.

In response to an information for log data uploading, the common information processing module 1201 is activated (step S1601) and a request for transmission of the MIF file including the log data is issued to the device monitor module 203a (S1602).

Then the MIF file is received as a response (S1603), and is stored in the inventory database 109 (S1604). Then there is issued a deletion request for the MIF file to the device monitor server 203a (S1605), and, upon completion of these processes, the end of process is informed to the backend (S1606).

<Process Sequence by Device Monitor Server>

Figure 17:
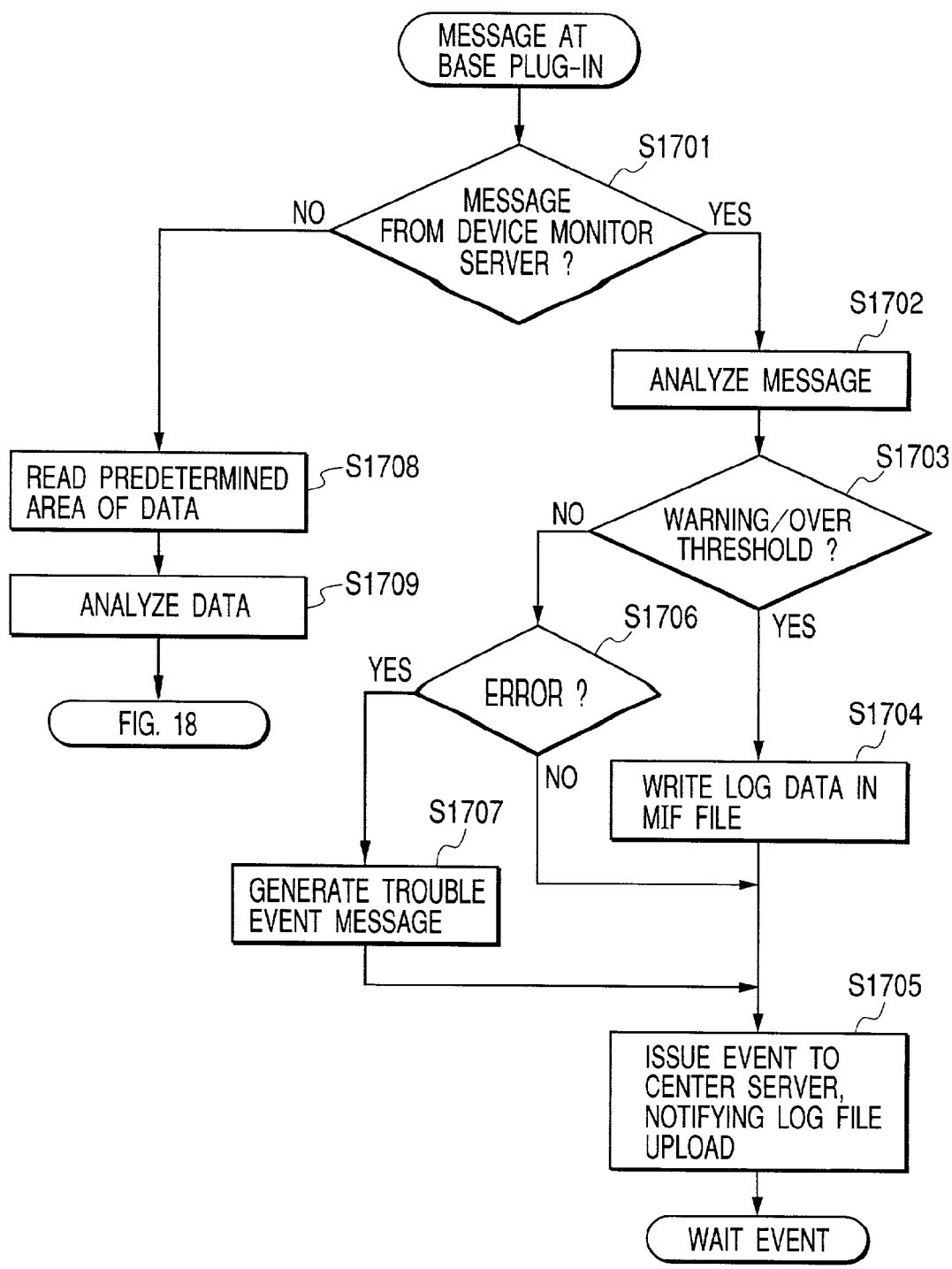
FIG. 17 is a flow chart showing the process sequence for a message or an even issued to a plug-in at a base plug-in 203b.

FIG. 17 is a flow chart showing the process sequence of the base plug-in 203b for a message or an event issued to the plug-in. The message issued from the center server 110 to the base plug-in 203b is stored by the monitor client 203d in a predetermined area, and the base plug-in 203b monitors such message either constantly or periodically.

When a message is found, there is discriminated whether the message is from the device monitor server 203a (step S1701), and, if so, the message is analyzed (S1702). If the message is a warning or exceeds a threshold value, the log data are prepared as an MIF file and an event informing the log data uploading is issued to the center server 110 through the PC monitor client 203d (S1705).

If the message is not a warning nor exceeds the threshold value, there is discriminated whether the message indicates an error (S1706), and, in case of an error, there is prepared a message indicating a trouble event and the sequence branches to a step S1705 (S1707).

Figure 18:
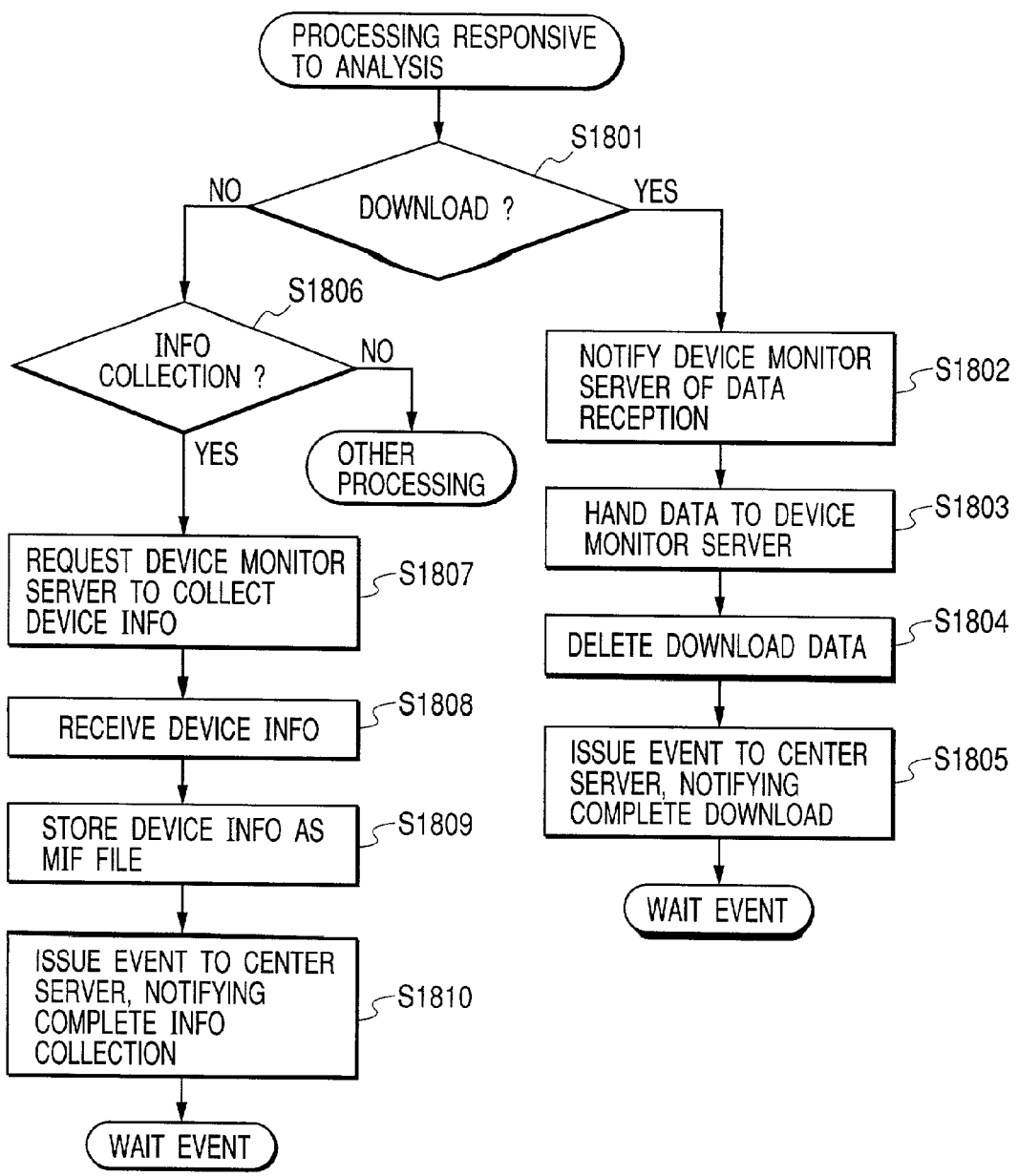
FIG. 18 is a flow chart showing the process sequence by the base plug-in 203b in response to a message received from a center server 1101.

If the message is not from the device monitor server 203a, the message is judged as from the center server 110 and the data of a predetermined area written by the PC monitor client 203d are read (S1708) and analyzed to execute a process matching the content thereof. FIG. 18 shows the details of the process matching the analyzed content.

FIG. 18 is a flow chart showing the process sequence by the base plug-in 203b according to the message received from the center server 110.

At first there is discriminated whether the message is download data (step S1801), and, if so, the reception of the download data is informed to the device monitor server 203a (S1802), and the data are transferred thereto (S1803). Then the transferred data are deleted (S1804), and a download completion event is issued to the center server (S1805).

If the message is not download data, there is discriminated whether the message is a device information collection request (S1806), and, if so, the collection of the device information is requested to the device monitor server (S1807).

When the device information is received from the device monitor server 203a in response (S1808), the information is stored as an MIF file (S1809), and a message indicating that the device information is collected is issued to the center server 110.

<Process Sequence by PC Monitor Client>

Figure 19:
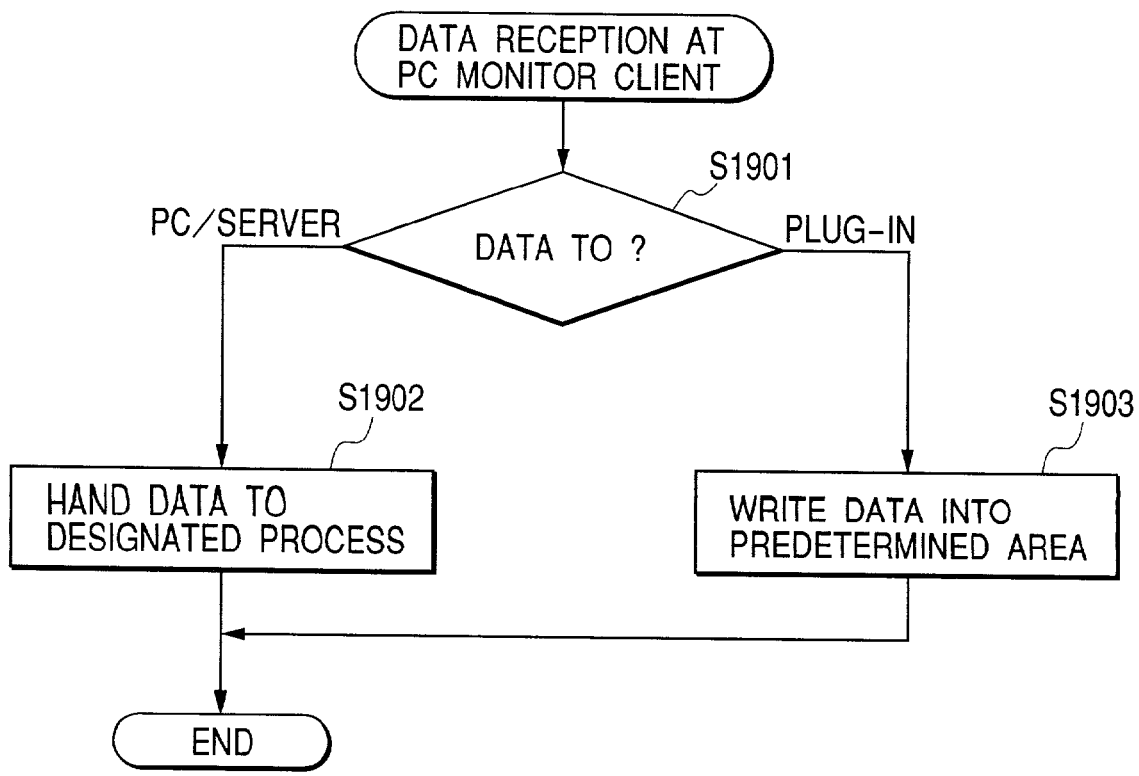
FIG. 19 is a flow chart showing the process sequence in case a PC monitoring client receives a message.

FIG. 19 is a flow chart showing the process sequence in case the PC monitor client receives a message.

Referring to FIG. 19, the destination of the received data is discriminated (step S1901), and, if addressed to a general-purpose computer such as PC/server, the data are transferred to the designated process (S1902), but, if addressed to the base plug-in, the data are written into the aforementioned predetermined area.

As explained in the foregoing, the system of the present embodiment can utilize a monitor system for a general-purpose computer for managing a peripheral device, provided in a managed site same as that of the general-purpose computer to be monitored. Thus, at the managing site, the general-purpose computer and the peripheral device can be monitored by a same method in a unified manner. Also the collection of information and the setting of a parameter on the peripheral device can be achieved from the managing site through the monitoring system. Also the log data can be transmitted from the managed site to the managing site.

Also in the monitor system for the general-purpose computer, the modules to be added for managing the peripheral device can all be realized by softwares, so that no hardware is required for this purpose and there can be prevented the increase in the magnitude of hardware such as the installation area, equipment cost and maintenance works.

Also the present invention is not limited to a configuration of adapting the management information of the device type to the management software of the general-purpose computer (PC/server), but is likewise applicable to a configuration of adapting the management information of the general-purpose computer (PC/server) to the management software of the peripheral device.

Third Embodiment of Management System

In the following there will be explained a management system for the service and expendables in which the management systems of the first and second embodiments are applied.

FIG. 20 shows the details of the base system and the center system shown in FIG. 2. At first there will be given an explanation on the user base system 2001.

The copying apparatuses A 2004 and B 2007 indicate models or types thereof. Also for the printer, personal computer or server, A and B indicate models or types thereof. A manager PC 2016 manages the equipment of PC/server type such as a server A or personal computer A and the equipment of device type such as the printer A, connected on a network 2017. The objects of the present invention can be attained if the servers A and B have respective logical functions even in case they are physically realized by a single apparatus.

The manager PC 2016 also executes information exchange with the servers A, B. The detailed configuration of the equipment such as the manager PC, the personal computer A, the server A etc. is same as that shown in FIG. 3, but there is also provided detection means for detecting that the capacity of HD is full and requires addition.

The network 2017 indicates a network such as LAN, but the present invention is naturally applicable also to a configuration in which the equipment of PC/server type and the peripheral devices thereof are connected through wireless communication such as infrared communication or bluetooth. In case such wireless communication is applied, a LAN controller 8 shown in FIG. 34 also serves as a wireless communication control unit. Also in such case, the equipment of device type such as the printer A is to be provided with a wireless communicating function.

The user base system 2001 corresponds to the user base system shown in FIG. 2; the network 2002 to the network shown in FIG. 2; the center system 2003 to the center system shown in FIG. 2; the copying apparatus A, the printer A etc. to the equipment of device type in FIG. 2; the personal computer, the manager PC etc. to the equipment of PC/server type; the server A to the device monitor server 203a in FIG. 2; and the server B to the PC monitor client module 203d in FIG. 2. Also other components corresponding to FIG. 2 and not shown in FIG. 20 will not be explained further but are assumed to be present in the following description.

Also, as explained in the network 2017, a network 2002 connects the user base system 2001, the center system 2003, a financing organization 2023, a distribution organization 2024 by wired or wireless communication. The financing organization or the distribution organization indicates an information processing apparatus provided in each organization.

Also, through not illustrated, the equipment of device type such as the copying apparatus A, B or the printer B is provided with functions of print controller, network communication, and error detection in HD or for absence of expendables, but the details will not be explained since they are based on the known technologies. Also the equipment of PC/server type such as the personal computer A is provided with a memory (including RAM or HD), and in case of a notebook PC, there is provided an error detection sensor for detecting an error in the expendable such as the battery.

In case an error is detected in either of the equipment of device type and that of PC/server type and the corresponding information (including the absence of expendable) is informed to the servers A, B, there is added device specifying information for specifying the own device (device emitting the information) to the error information. Such device specifying information is stored in an internal memory of each device. A machine number/serial number, a MAC address or an IP address corresponds to such information. Also the expendable type number of the expendable, stored in a non-volatile memory provided in the expendable can also serve as the device specifying information. The server A or B, receiving such device specifying information, is provided in a memory with a database capable of specifying the type of the device or the expendable from the expendable type number. Through the comparison of such database with the device specifying number or the expendable type number, it is rendered possible to recognize the equipment, among those of device type and PC/server type, in which the expendable is consumed. FIG. 23 shows an example of the database, of which details will be explained later. Also the procedure of communication has been explained in the foregoing and will not be explained further.

In the following there will be explained the center system 2003, for executing the maintenance management etc. of the user based on the information transmitted from the user base system. A center server 2018 executes collection/management of the information on the devices of the user side. A center server 2020 executes collection/management of the information on the PC/server of the user base side. The information relating thereto is stored and managed in an inventory database 2021.

An application system 2022 and a backbone system 2025 are provided with a function of executing dispatch of a service personnel etc. based on the information collected by the device center server 2018 and the center server 2020.

The backbone system 2025 also has a function as the information window for the center system 2003, the financing organization 2023 and the distribution organization 2024.

In FIG. 20, the device center server, the center server, the inventory database, the application system and the organization system are illustrated to be in a same site, but the objects of the present invention can be attained as long as they are logically unified even if they are composed of physically separate apparatuses or are located in different sites and mutually connected by a network.

A device center server 2018, an event adaptor 2019, a center server 2020, an inventory database 2021 and an application system 2022 respectively correspond to the device center server 210, the event adaptor 210a, the center server 110, the inventory database 109 and the application system 205 in FIG. 2.

The financing organization 2023 is provided with a function of exchanging monetary information with the user base system 2001n and the center system 2003. The information representing money can be, for example, electronic money. Also the distribution organization 2024 has the function of distribution with the user base system 2001 and the center system 2003 and is bidirectionally connected thereto with respective networks.

Figure 21:
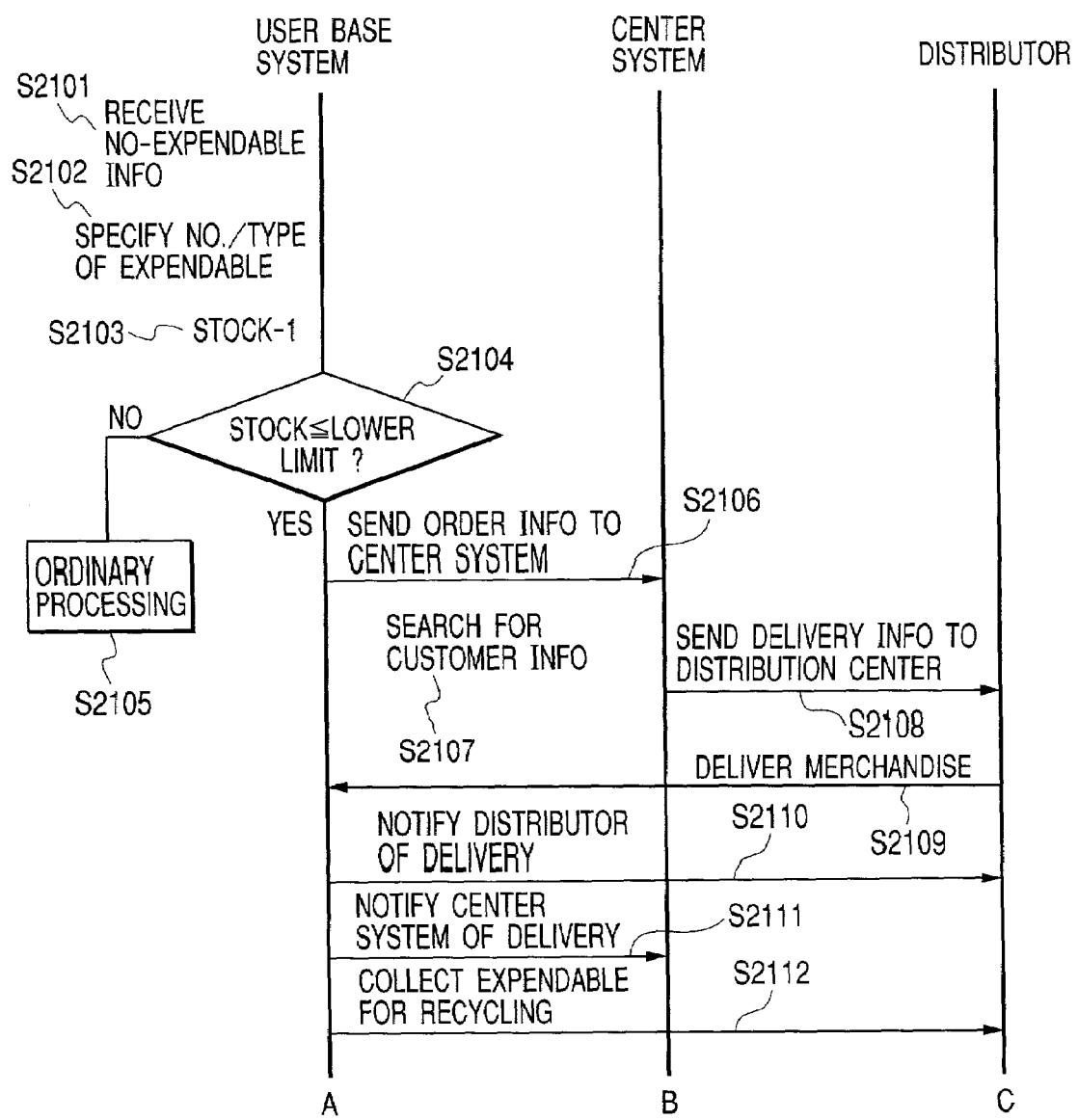
FIG. 21 is a flow chart showing an example of the process sequence executed among a user base system, a center system and a distribution organization.

In the following there will be given an explanation on FIG. 21. The user base system, center system, financing organization and distribution organization are same as those shown in FIG. 20 and will not be explained further.

At first a step S2101 informs the server A or B at the user base system of an information signal indicating the absence of expendable, detected by the equipment of device type or that of PC/server type provided in the user base system. The information is executed by a device such as the printer provided in the user base system, for the expendable corresponding to the device. As explained in the foregoing, the servers A, B respectively correspond to the device monitor server 203a and the PC monitor client module in FIG. 2.

In a step S2102, the server A or B receiving the aforementioned signal specifies the device informing the absence of expendable based on the received information, and specifies the model/type of the expendable used in thus specified device, utilizing the database.

In a step S2103, the inventory amount of the model/type of the specified expendable is managed by referring to the database of own or another device. More specifically, the inventory information in the database is referred to, then the inventory number is subtracted from the referred inventory amount and the result of subtraction is stored again in the database. A signal indicating the absence of expendable is once outputted from a specified device, the same signal is not repeatedly outputted until expendable replacement detection means provided in the equipment of device type or PC/server type detects the replacement by a new expendable. The expendable replacement detection means is capable of recognizing the replacement of the expendable by detecting, for example, the change in the inventory amount of the expendable. More specifically, when the expendable absence signal changes from an empty state (called low level state) to a state of a sufficient remaining amount (called high level state), the expendable replacement detection means is shifted from a low level state to a high level state and recognizes the mounting of a new expendable to the image forming apparatus when the high level state continues for a sufficiently long period. Naturally the expendable replacement detection means is not limited to such type but can be based on various systems. Also there can be conceived a configuration in which the error information generated in the equipment of device type such as the printer in the user base system, the information indicating the working status such as the absence of expendable or the number of printer, and the information generated in the equipment of PC/server type such as the personal computer or the server are collectively managed in the service center.

A step S2104 discriminates whether the result of subtraction is less than a predetermined lower limit of the inventory, and, if not, the sequence enters a waiting state for the information on the absence of expendable or an ordinary sequence for executing another process (S2105).

The aforementioned steps S2101, S2103 and S2104 have been explained to be executed in the server A or B in the user base system, but they may also be executed in the center system. Such configuration can be realized, for example, by the expendable absence signal from the device of the user base system to the center system 2003 through the network.

In case the result of discrimination in S2104 is less then the predetermined value, order information is automatically informed to the center system 2003 (S2106). Instead of automatically sending the order information to the center system, it is also possible to send a confirmation mail, whether or not to approve the automatic information, to the display of the manager PC and to execute the transmission of the order information when the ordering is instructed from the manager PC. In the present invention, it is also possible to execute the informing to the center system after an instruction by the customer for the ordering, as will be explained later in more details.

The aforementioned order information includes, in addition to customer information for specifying the customer, information for specifying the device in which the expendable is absent and information indicating the number of the expendable to be ordered.

A step S2107 searches the customer based on the customer information included in the order information received by the process of the step S2106. The search of the customer information is executed by referring to a customer database stored in the device center server 2018 or the application system 2022 of the center system 2003 shown in FIG. 20.

A step S2108 transmits a delivery instruction (distribution information) for a merchandise based on the specified customer and the type and number of the expendable. This instruction is executed for example by the already known e-mail.

A step S2109 executes delivery of the merchandise from the distribution organization 2024, and a step S2110 executes information for the delivery in S2109. The step S2110 informs the distribution organization of the number/type of the actually delivered merchandise on site by the service personnel, utilizing a device such as the portable terminal thereof. In the present invention, the information may also be executed for example from the manager PC.

In a step S2111, the type/number of the merchandise actually delivered from the distribution organization 2024 to the user base system 2001 is informed therefrom. More specifically, the type/number of the merchandise actually delivered in S2109 is informed in the user base side, based on the input in the input unit such as the keyboard of the server A 2011 or the manager PC 2016. This information is utilized in comparing the information of the type/number of the actually delivered merchandise informed from the distribution organization 2024 to the center system 2003 (S2201 in FIG. 22) and the information from the user base system 2001 (S2111 in FIG. 21). In this manner the center system 2023 can manage the delivery information and the inventory information at the user base in more exact manner.

A step S2112 requests recovery of the expendable. The recovery request may also be once sent to the center system and then informed to the distribution organization. Then the used expendable is recovered by the service personnel of the distribution organization. The operation of S2111 may be executed at the timing of delivery or at another timing.

Figure 22:
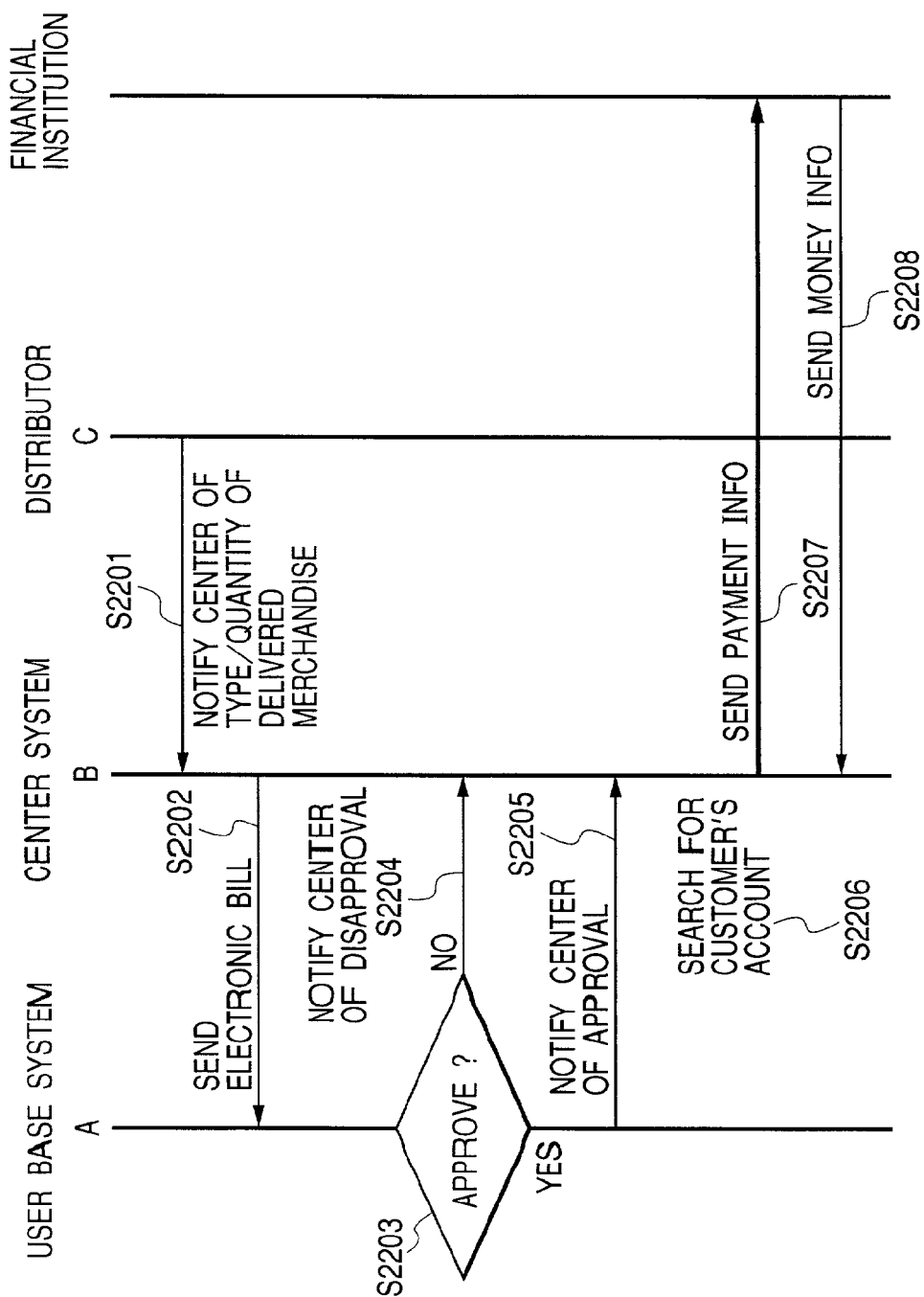
FIG. 22 is a flow chart showing an example of the process sequence executed among a user base system, a center system, a distribution organization and a financing organization.

In the following there will be explained the process shown in FIG. 22 which is the continuation of that shown in FIG. 21. In FIG. 22, A, B and C respectively correspond to A (user base system), B (center system side) and C (distribution organization) in FIG. 21.

A step S2202 transmits, to the user base system, an electronic bill generated in the center system based on the information received in S2201 and S2111. The electronic bill is received by the server A or B, and an electronic mail indicating the arrival is informed to the manager PC.

In the present invention, it is also possible to execute such informing by uploading the electronic bill to a server provided on the internet. In such case, the content of the electronic bill on the internet can be viewed by sending a password to the manager PC of the user base system.

A step S2203 generates information whether the user approves or not the informed electronic bill. The information relating to the approval includes user ID information for specifying the user and a management number for each user.

If the approval in S2203 is refused, a step S2204 informs the center system of the refusal from the web browser in S2203. The informing sequence will be explained later.

In case S2203 generates approving information, a step S2206 specifies the customer and searches the account information of the customer based on the approving information in S2205.

A step S2207 transmits, to the financing organization, an extracting command from the customer account based on the account information specified by the search in S2206, and a step S2208 enters the electronic money into the center system. There may also be considered ordinary payment by cash.

FIG. 23 shows an example of the management database for managing the equipment of device type and PC/server type owned by the user, and the expendable used therein.

The information of the database is stored in the server A 2011 of the user base system or any device in the center system.

A column 2301 indicates the number/serial number of the installed equipment. A column 2302 indicates a MAC (media access control) address. A column 2303 indicates an IP (internet protocol) address. A column 2304 indicates the ID of the expendable, enabling to identify the type of the expendable. A column 2305 indicates the date of the second latest replacement of the expendable, for each equipment. A column 2306 indicates the date of the latest replacement of the expendable for each equipment. A column 2307 indicates the anticipated date of next replacement, calculated and displayed from the past replacement history of the user for the expendable and from the use rate of the currently used expendable. These data are processed by a program installed in the manager PC or a program stored in the server A. The display in the column 2307 may also be displayed in the form of "X days to go", namely by the remaining number of days to the anticipated date of next ordering.

FIG. 24 shows a database stored in the server A or in any device of the center system, as in FIG. 23. A column 2401 indicates the type of expendable, and a column 2402 indicates the inventory amount of each expendable. A column 2403 indicates the order threshold value, under which the ordering becomes necessary. This threshold value may be set as a default value by the service provider or may be set for each expendable by the user. The setting can be achieved by displaying the data of FIG. 24 and executing entry in a column with an input device such as a keyboard or a mouse. The threshold value thus entered is memorized as the set value.

A column 2404 indicates an order unit, namely the number of expendables that can be ordered at a time. The information indicating the order unit may also be set by the user as in the data in the column 2403. A column 2405 indicates the inventory status and the user can recognize the inventory status of each expendable by watching this column. In this column, a text "stock OK" means that the inventory is so sufficient as not requiring the ordering, and a text "order next" means that the inventory still has a certain margin. Also a text "order" means that the ordering is necessary. Such plural inventory levels allows the manager to execute more detailed inventory management, and there can be achieved reduction of inventory since the ordering can be executed at different timing for each type of the expendable. It is also possible to obtain a demand estimate for the expendables for each user or for a group of plural users by receiving and managing, at the center server 2003, the information of each user as shown in FIGS. 23 and 24.

FIG. 25 shows the history on the bills, in which, for each bill number shown in a column 2501, there are shown a billing date (2502), a history of approval/non-approval (2503), a date of approval (2504) and a reason of disapproval in case of disapproval (2505). This database is also stored in the server A as in the databases in FIGS. 23 and 24.

Figure 26:
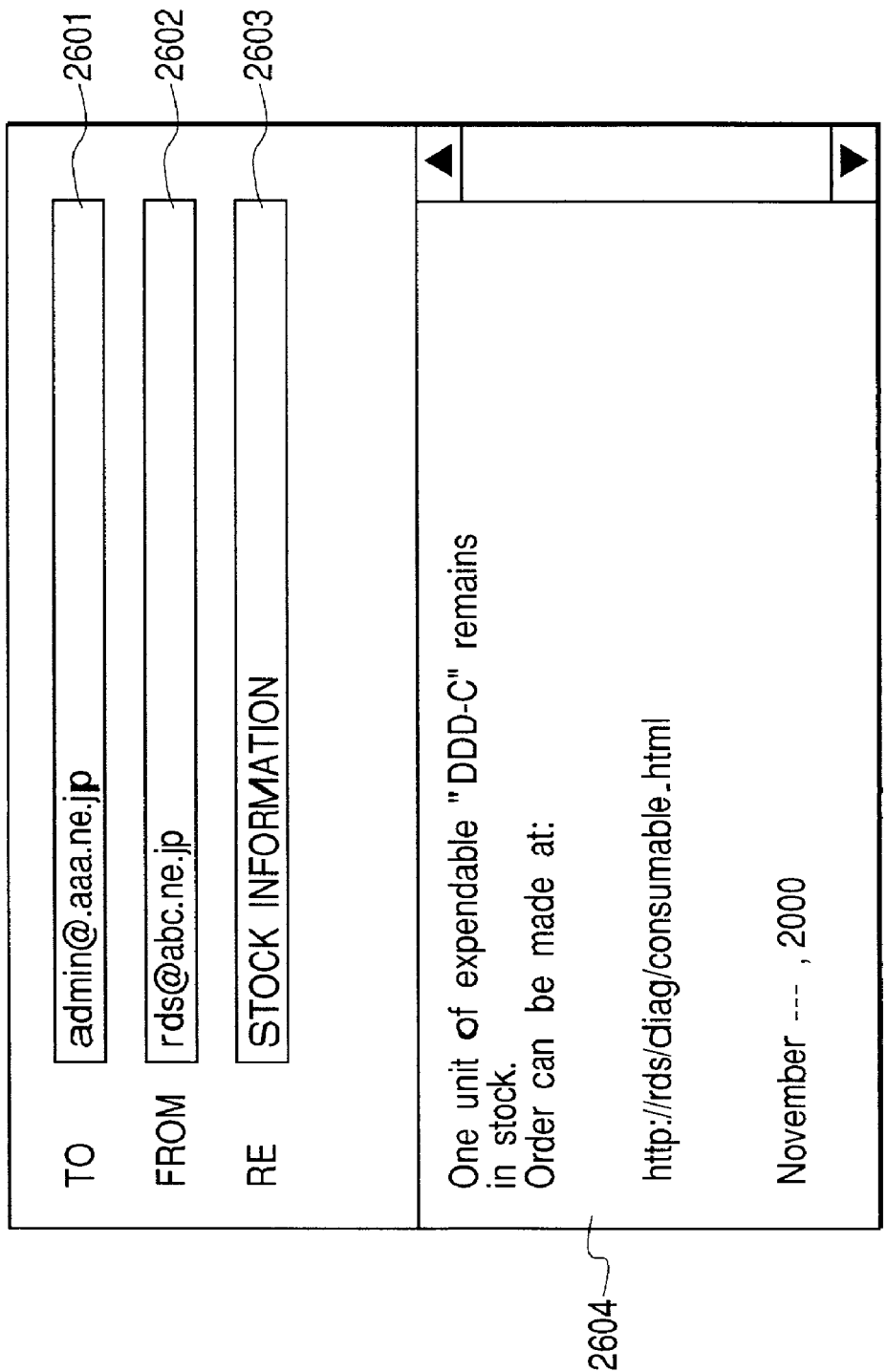
FIG. 26 is a view showing an example of display of a no inventory warning and an order guiding mail.

FIG. 26 shows an example of the display on the manager PC, for informing that the inventory of expendable has decreased. There will be explained the sequence for displaying such image. When the inventory amount decreases to the order threshold value 2403 shown in FIG. 24, the server A provided with the database for FIG. 24 transmits a mail indicating such fact to the manager PC. A text "one unit of expendable DDD-C remains in stock" is generated from the type of the expendable and the order threshold value corresponding to such type.

This image is displayed for each type of the expendable whereby the manager can recognize the inventory amount or the absence of inventory for each expendable and can manage the individual ordering. Also an address 'http://rds/diag/consumable.html' in the column 2604 indicates the URL storing the order sheet for the expendable. By designating such URL with the pointing device such as a keyboard or a mouse, there can be viewed an image as shown in FIG. 27 on the manager PC by the web browser or the like. The display information that can be viewed by the web browser is stored for example in the HD of the server A 2001 (corresponding to the HD storing the aforementioned databases). It may also be stored in memory means such as HD in any device of the center system 2003.

It is also possible, in the present invention, to install in advance an exclusive application for enabling the manager PC to view the display image as shown in FIG. 27 and to cause the manager to activate such application and to actuate a "diagnosis button" displayed on the display image of such application, thereby displaying the image as shown in FIG. 27 at a timing desired by the manager.

FIG. 27 shows an order instructing image for the expendable, wherein a column indicates the type of the expendable. Columns 2702 to 2704 correspond to those 2402 to 2405 in FIG. 24 and will not be explained further. A selection button 2706 for ordering is not actuated for the item already ordered or having a sufficient inventory, or is rendered inactive for the selection by the pointing device.

By selecting the order button for each type of the expendable, there is ordered the expendable of the type corresponding to the selected ordering button.

A column 2707 indicates the type and the number of the expendable selected to be ordered by the button 2706, and displays the expendable of the type corresponding to the selection by the ordering button. The amount of order is determined by referring the database corresponding for example to FIG. 24 and is automatically displayed. There may also be utilized an input by a pointing device such as a keyboard used by the user.

The depression of an OK button 2708 confirms the order. Also the depression of a button 2709 cancels the order whereby the display in the column 2707 is canceled.

The display shown in FIG. 27 allows the manager to easily execute the recognition of the inventory for each type of the expendable, thus far requiring cumbersome operations. Also the ordering can be executed at an appropriate timing for each type of the expendable, thereby minimizing the inventory of the expendable and reducing the space of inventory.

Figure 28:
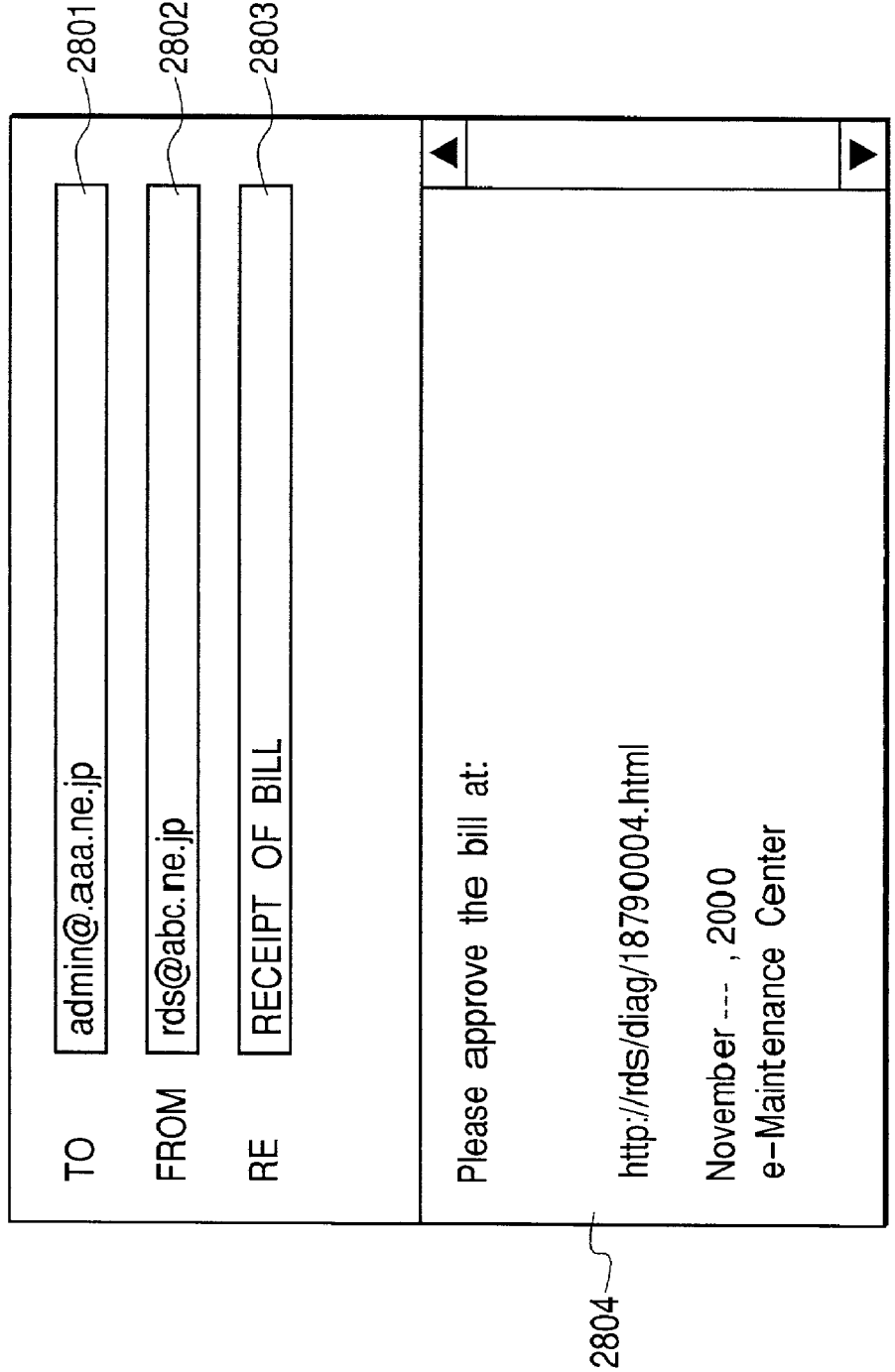
FIG. 28 is a view showing an example of display of an approval requesting image.

FIG. 28 shows a display generated by the server A based on bill data (FIG. 29) transmitted from the center system 2003 to the server A of the user base system. At first there will be given an explanation on FIG. 29.

FIG. 29 shows an example of the display of an approving image when the URL shown in 2804 is selected. FIG. 29 shows, in addition to the billed amounts, an approval button 2905, a disapproval button 2906 and an input column 2907 for entering a reason for disapproval in case of the disapproval. The approval or disapproval entered by the button 2905 or 2906 is informed to the server A or B and then from the center A or B to the center system 2003.

The disapproval information is also utilized when the operator of the center server obtains confirmation of the disapproval from the user.

The information shown in FIG. 29 is generated by the center system when the order button 2708 in FIG. 27 is depressed and information indicating this fact is informed from the server A to the center system, and the generated information is transmitted from the center system to the server A of the user base system. Such information is stored in the server A or in any device of the user base system, in order to avoid forging by the user.

Such information, transmitted from the center system to the server A, includes mail generating information for generating, in the server A, a mail for informing the manager PC, from the server A, of the display information as shown in FIG. 28. Such mail generating information includes a number assigned to each user, and a user management number assigned within the specified user. FIG. 28 shows an example of the display of such mail information to the manager PC.

In FIG. 28, a text 2804 'http://rds/diag/18790004.html' represents the URL for accessing to the approving image, and the user can shift to the approving image by selecting such URL. The information of the approving image is stored in the server A.

Within a text 2908 'No. 1879-0004' in FIGS. 28 and 29, 'No. 1879' is a number assigned to each user for user management, and '0004' is a management number in the specified user.

FIG. 30 shows an example of the bill image displayed on the manager PC when the approving button 2905 is selected in FIG. 29.

FIG. 31 shows an example of a disapproval confirming image displayed for confirmation on the manager PC when the disapproval button 2906 is selected in FIG. 29. This image allows to confirm the disapproval by the manager, in contrast to the image to be displayed in case of approval in FIG. 29.

The images shown in FIGS. 30 and 31 are generated and stored in the center system 2003 or the server A.

Figure 32:
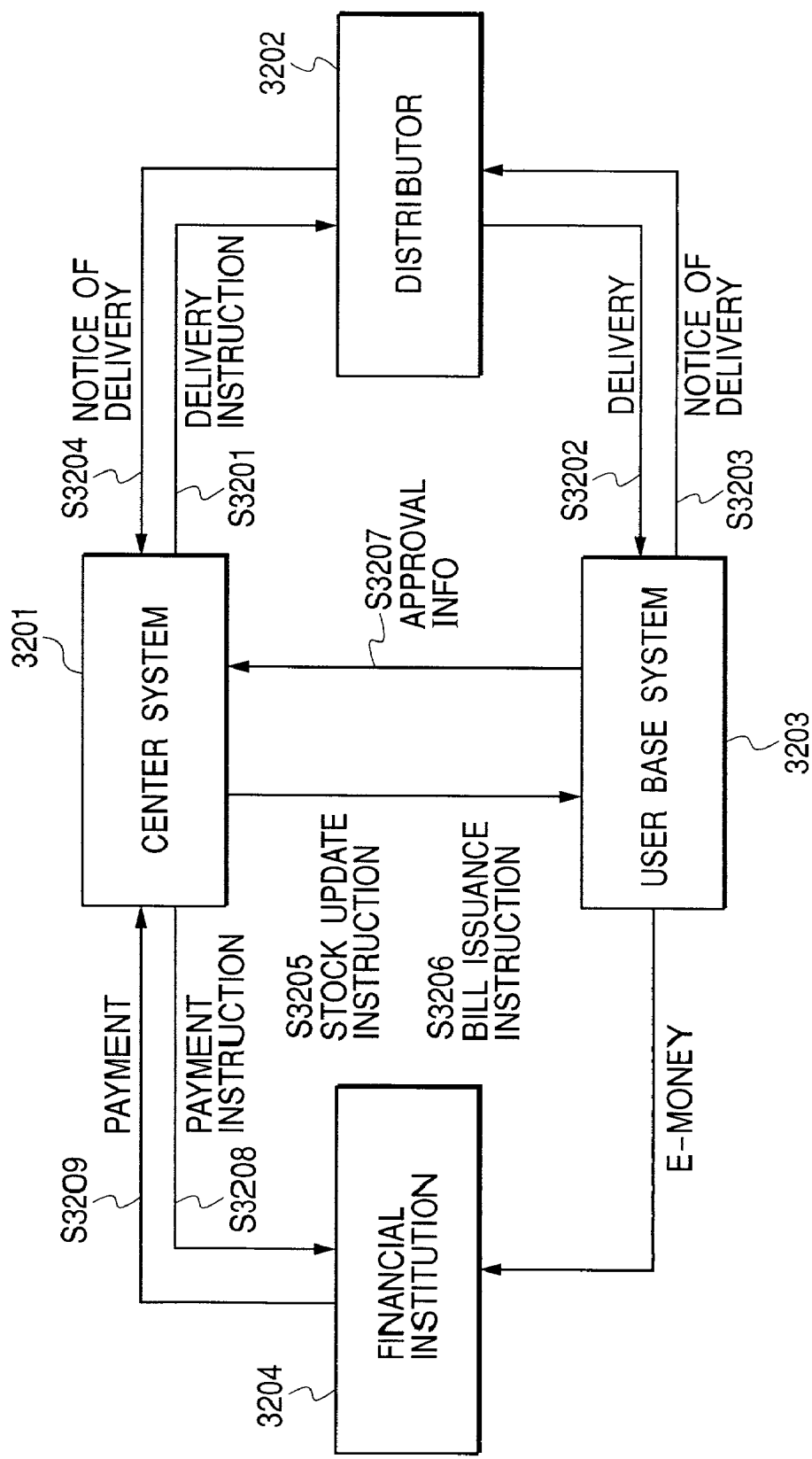
FIG. 32 is a view showing the information flow among a user base system, a center system, a distribution organization and a financing organization.

FIG. 32 is a view showing the flow of information and merchandise among the financing organization 2023, distribution organization 2024, user base system 2001 and center system 2003 shown in FIG. 20. When an order instruction is informed from the user base system to a center system 3201 (corresponding to the center system 2003 in FIG. 20), a distribution instruction is transmitted from the center system 3201 to a distribution organization 3202 (corresponding to the distribution organization 2024 in FIG. 20) (S3201). Receiving the distribution instruction, the distribution organization 3202 executes the distribution and delivery of the merchandise to a user base system 3203 (corresponding to 2001 in FIG. 20) (S3202). When the delivery is completed, the user base system 3203 transmits a completion information to the distribution organization 3202 (S3203). Receiving the completion information, the distribution organization transmits it to the center system 3201 (S3204). Receiving the completion information, the center system 3201 transmits an inventory renewal command to the user base system (S3205) and also transmits a bill issuing command (S3206). A step S3207 transmits approval information (approval or disapproval) based on the bill issuing command in S3206 to the center system 3201. Receiving the approval information from the user base system in S3206, the center system 3201 transmits sum collection requesting information to the financing organization 3204 (S3208). When the user instructs payment for example by electronic money, a step S3209 executes collection of electronic information such as electronic money (corresponding to cash collection).

The system shown in FIG. 32 allows to reduce the down time of the devices resulting from the absence of inventory of the expendables.

Fourth Embodiment of Management System

In the following there will be explained a fourth embodiment of the present invention, with further details of the center system.

Figure 33:
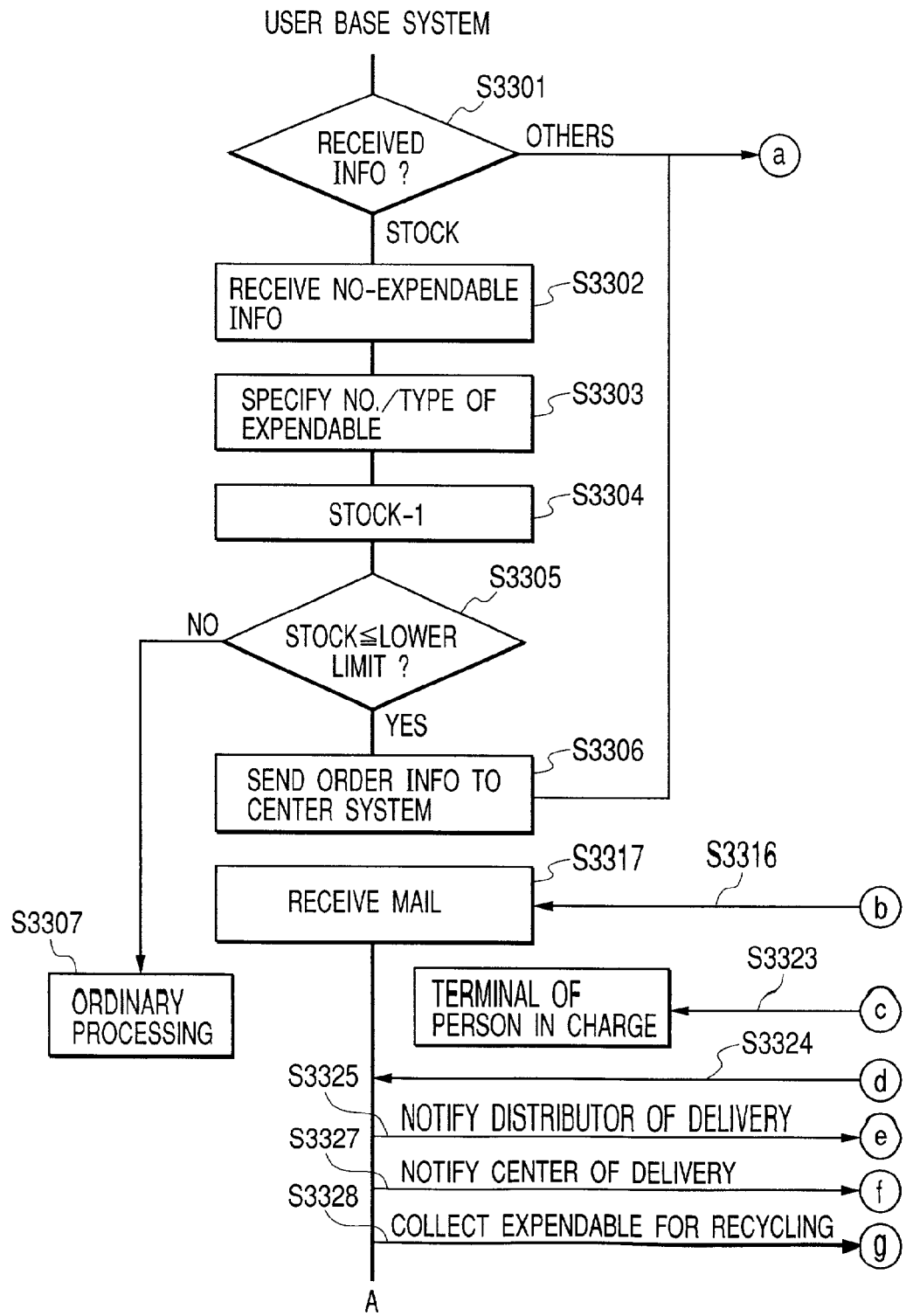
FIG. 33, which is comprised of FIGS. 33A and 33B, is a view showing the process flow among a user base system, a center system and a distribution organization.

FIGS. 33A and 33B show the process among the user base system, the center system and the distribution organization in the fourth embodiment. The user base system corresponds to the device monitor server 203a, the PC monitor client 203d or an information processing apparatus having both functions, while the center system corresponds to the device center server 210, the center server 110 or an information processing apparatus having both functions. Also the distribution organization means an information processing apparatus provided in the distribution organization 2024 explained in the foregoing embodiment. The process of each step is executed by the information processing apparatus constituting the main body of the process, and is realized by a CPU (central processing unit) provided in the information processing apparatus of the user base system center system and distribution organization by reading a control program stored in non-volatile memory means such as a ROM or a hard disk.

At first a step S3301 executes maintenance/management processes in the user base system. Such maintenance/management processes mean a process executed by the device monitor server 203a or the PC monitor client upon receiving an error or status information from the equipment of device type or of PC/server type through the network, and there is discriminated whether the received information is used for a process for inventory management to be utilized by the equipment of device type or for other processes.

The step S3301 recognizes the object of the information received from the equipment of device type or PC/server type. If it is identified to be related with an inventory-related process, a step S3302 receives and recognizes expendable absence information including information which is informed from the equipment of device type, is related with the inventory and is at least capable of specifying the type of the expendable. The step S3302 is practically included in the step S3301 but is explained separately for the ease of understanding.

Then a step S3303 executes, based on the received information, a process for searching and specifying the device corresponding to type of the expendable which has become absent. The information informed from the equipment of device type can be, for example, that explained in FIG. 23. It is thus rendered possible to specify the type of the expendable which has become absent and the corresponding device in which the expendable has become absent.

Then a step S3304 executing a process of reducing the inventory number of the expendable, corresponding to a decrease of the invention of the expendable of the type specified in the step S3303. Then a step S3305 executes discrimination whether the inventory number of the expendable of the type subjected to the process of the step S3304 has reached the threshold value or less. The processes of the steps S3304, S3305 at least includes those of the steps S2103, S2104 already explained in FIG. 21.

Then, in case the step S3305 identifies that the inventory number (amount) of the expendable of the object type has become equal to or less than the threshold value, a step S3306 generates order information at least including the type of the expendable which has become absent and the user information allowing to specify the user and transmits such order information to the center system.

In the following there will be explained the process of a step S3308, corresponding to a center system process. At first there is received, through a predetermined communication channel, information from the user base system (device monitor server 203a and/or PC monitor client 203d).

Then a step S3309 discriminates whether the information received in the step S3308 is from an equipment of device type or that of PC/server type. This discrimination can be achieved by the center system by referring to a bit flag indicating whether the received information relates to an equipment of the device type or an equipment of PC/server type.

In case the result of the step S3309 is Yes, namely in case the information received in the step S3308 is from an equipment of PC/server type, there is executed the aforementioned process corresponding to the equipment of PC/server type.

On the other hand, in case the result of the step S3309 is No, a step S3311 discriminates whether the information is inventory absence information for example by analyzing a bit information assigned to the received inventory absence information. The function of S3311 can also be realized by discriminating, in the step S3309, whether the information received in the step S3308 relates to an equipment of PC/server type or the inventory management of the expendable. As explained in the foregoing, the present embodiment allows unified management of the maintenance information on the equipment of PC/server type and the maintenance information on the equipment of device type, and efficient management of the inventory of the expendables used in the equipment of device type. There may also be received information on the expendables in the equipment of PC/server type, and, in such case, there may be inserted a discrimination whether the message informs the absence of expendable in the equipment of PC/server type after the step S3311 and there may be executed various service processes according to the result of such discrimination.

Figure 34:
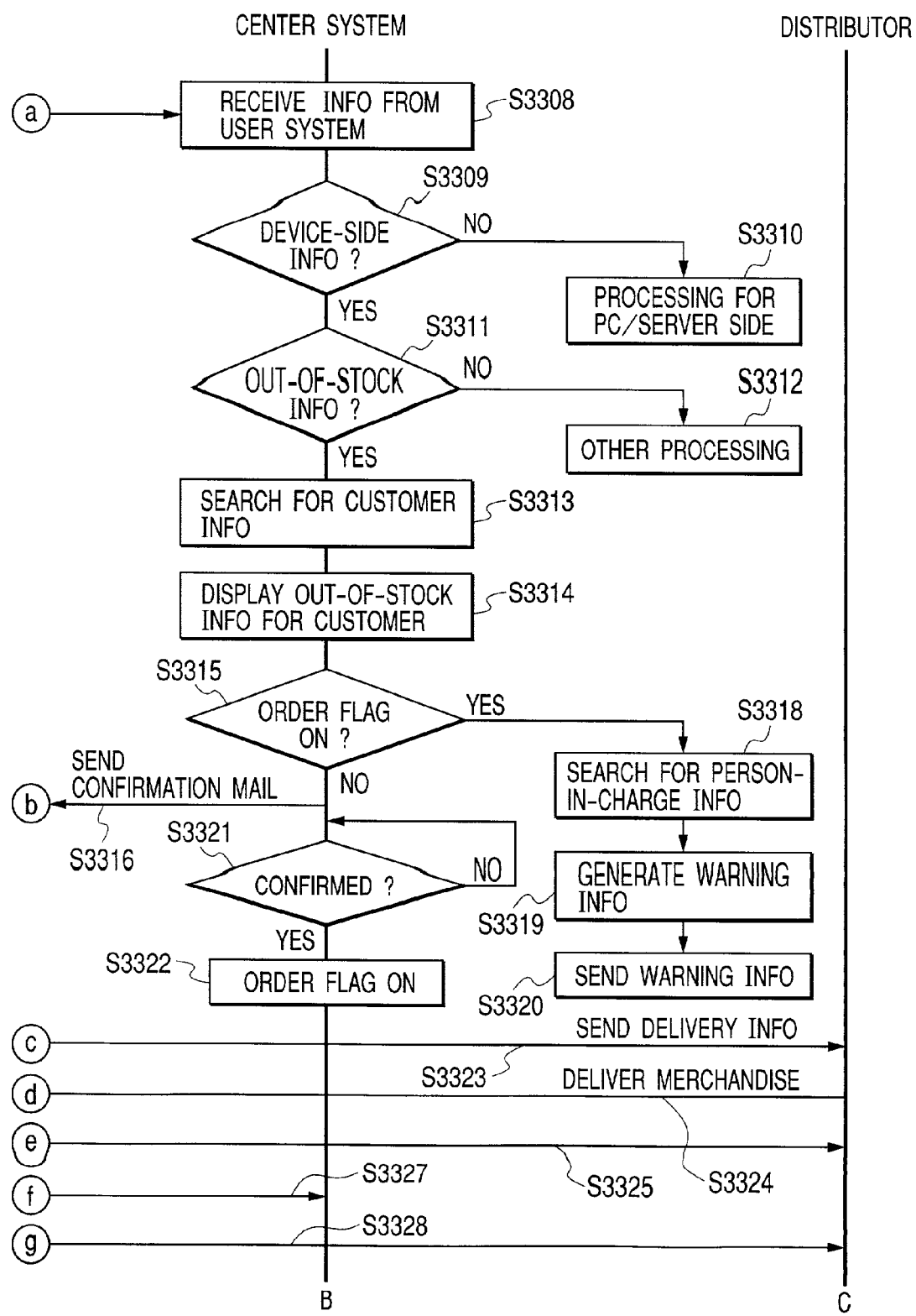

In case the result of the step S3311 is No, namely in case the information is not related with the inventory management (for example paper jam warning of high frequency), a step S3312 executes another process corresponding to the equipment of device type. An example of such another process is the transmission of setting information for regulating the function of the printing apparatus. On the other hand, in case the result of the step S3311 is Yes, a step S3313 searches the detailed information of the customer (name and address of the customer) in the customer information contained in the order information and allowing to specify the customer, and a step S3314 display, on the display unit, the information relating to the absence of expendable in correspondence with the searched information relating to the customer. The display unit corresponds for example to the event monitor 110a explained in the foregoing. Also the processes of the steps S3313 and S3314 may be executed immediately after the process of the step S3308. FIG. 34 shows the mode of display corresponding to the step S3314.

FIG. 34 shows the mode of display of a monitor image in the center system. It also indicates unified management of the plural equipment.

A column 3401 indicates the date and time of information of an event from the user base system to the center system or of generation at the user base system. A column 3402 'confirmation No.' corresponds to an order management number to be explained later. A column 3403 'e-Box No.' indicates identification information of a monitor server (device monitor server and/or PC monitor client module) installed in the user base system, allowing to identify the device monitor server and/or the PC monitor client module. In case the user is large and is provided with plural monitor servers, the information allows to specify the monitor server of which the device or PC shows trouble. A column 3404 shows the status of the delivery process of a new expendable, in case an order is instructed from the user for each absence of inventory (corresponding to Yes in the step S3321). This column is only changed by the turning-on of an order flag in a step S3322 to be explained later, and the display is so controlled to show a text 3403 'unprocessed' in case the order flag is not turned on, and to show a text 3409 'undelivered' in case the order flag is turned on but the new expendable is not yet delivered. In this manner the center system can execute unified management of the status of the services for the absence of inventory for plural users and plural equipment.

A column 3405 indicates an informing method corresponding to the process of a step S3316 to be explained later, and FAX communication or e-mail can be selected. A button 3407 executes the informing process according to the informing method selected by the column 3405, and corresponds to the process of a step S3316 to be explained later. A button 3406 is to shift to an image for editing the content of a confirmation mail corresponding to the process of the step S3316. When an instruction signal is entered by the button 3406 in a state where an event corresponding to 'e-Box No.' is selected from the displayed list, there are searched and displayed data such as customer information, type and amount of expendable etc. stored in advance in the database and corresponding to the selected 'e-Box No.', as shown in FIG. 35.

In FIG. 35, a column 3502 displays the customer information, and a column 3503 displays information indicating the type and order amount of the expendable. Such information indicates information based on the corresponding 'e-Box No.' and stored in advance in the database, but it is naturally possible also to change for example the order amount by an input from the operator. In response to the entry of an instruction signal by the button 3501, the display returns to a state shown in FIG. 34.

A button 3408 is used in searching the past event informed from the user base system to the center system. A button 3410 is used for switching the object of the event shown in FIG. 34. Selection of "service" causes display relating to a device trouble such as paper jamming, and that of "separation" causes display of monitor information on the equipment of PC/server type independent from that on the equipment of device type. Also selection of "expendable" causes display of information on the expendable inventory as shown in FIG. 34.

Again referring to the flow chart shown in FIG. 31, a step S3315 executes discrimination by the center system whether the order flag is on. The order flag corresponds at least to the order management number (for example the confirmation number in FIG. 34 or data 3602 in FIG. 36), which corresponds to the type and order amount of the expendable to be ordered, the order date and the customer information and is serially managed. Individually, such serial numbers may naturally be selected so as not to mutually overlap.

This order flag is to be turned "ON (ordered)" in case the order confirmation from the customer is recognized by the center system in a step S3321 to be explained later, and the order flag is shifted to information indicating the completion corresponding to the order management number, in case the merchandise is delivered by a distributing person or a service personnel (for example corresponding to a step S3324 to be explained later) and information allowing recognition of the delivery is recognized by the center system. By incorporating a system for controlling the order flag into the center system, there is enabled efficient management on whether the ordering work is properly executed.

In case a step S3315 identifies 'Yes', the sequence proceeds to a step S3321, but, in case of 'No', the sequence proceeds to a step S3318.

The result 'No' in the step S3315 occurs in case the order flag is turned 'ON' corresponding to the order management number through the step S3322 but the situation of no inventory is generated repeatedly because the merchandise is not yet delivered. The repeated generation of the situation of no inventory corresponds to a situation where the amount of the expendable of a certain type becomes lower than the inventory threshold value (S3305) to cause information from the user base system to the center system but the amount of inventory is further reduced to cause an information, indicating that the inventory is less than the threshold value, is transmitted again from the user base system to the center system. Information indicating such situation is informed through steps S3318, S3319 and S3320 to an address (for example e-mail address) assigned to a portable terminal of a person in charge (for example a service personnel in charge or a distributing person in charge), thereby requesting that the service personnel executes delivery of the merchandise and providing the user with a service capable of securely preventing the absence of inventory. Also, through not illustrated, information is provided to the user receiving the delivery in addition to the information in the step S3320, so that the user need not contact the service center or the like to expedite the delivery in case the expendable to be delivered is not immediately delivered for some reason, whereby the burden on the user can be alleviated.

Figure 36:
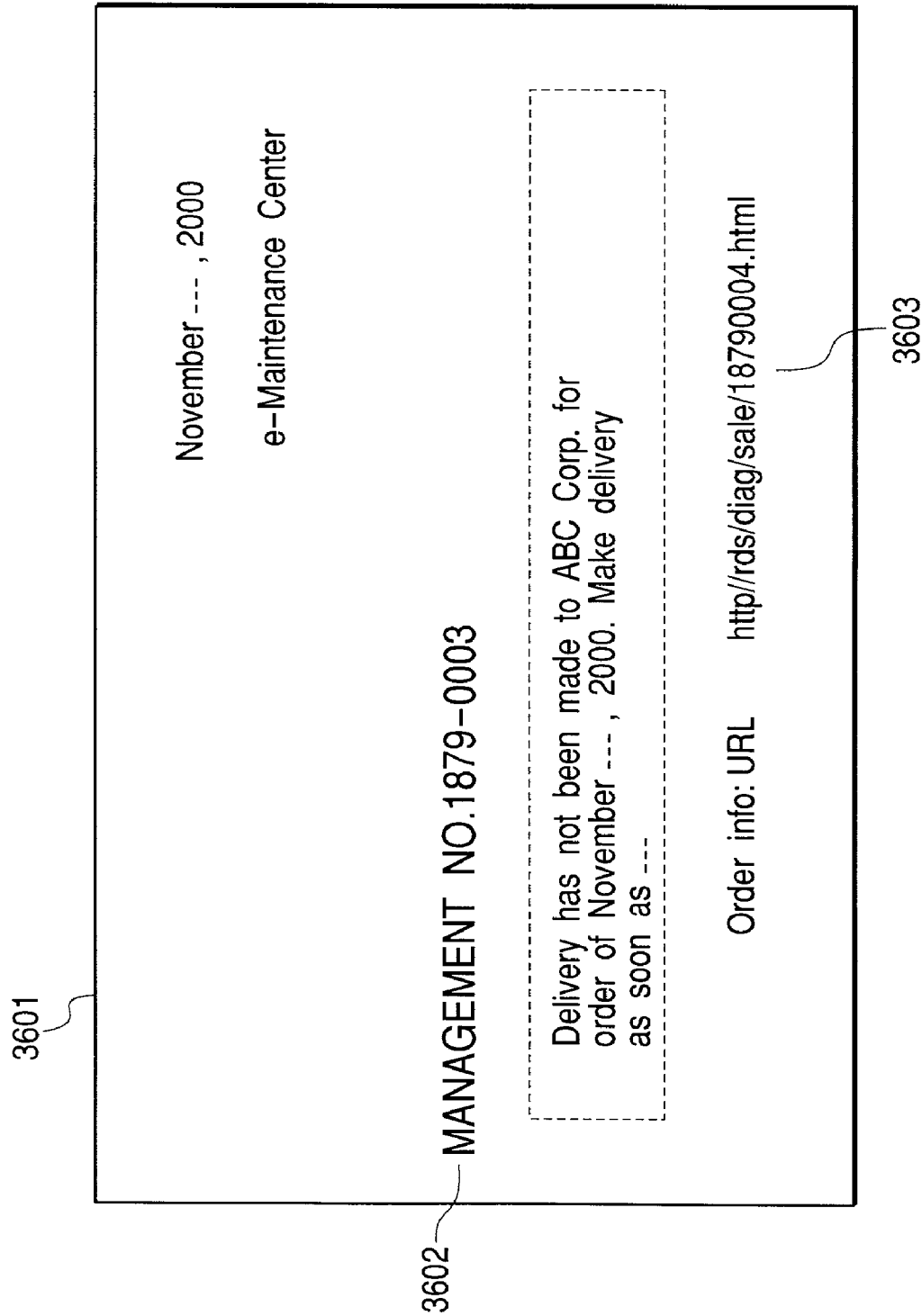
FIG. 36 is a view showing an example of a mode of displaying warning information.

FIG. 36 shows the mode of display of warning information, informed to the portable terminal owned by the service personnel (or an information processing apparatus installed in the base of the service personnel) through the processes of the steps S3318 to S3320. A text 3602 indicates the order management number and corresponds to the information managed in the database of the center system when the approval for the order by the customer is confirmed through the steps S3321 and S3322. Also a text 3603 indicates the content of order of the customer and indicates the URL for observing the order content information generated for each customer or each order and managed in the database of the center system. By designating the URL, the service personnel can confirm the content of the order of the customer on the portable terminal of the service personnel. The present invention also includes a configuration where the content of order and the customer information are originally included in the display shown in FIG. 36. In summary, the present invention is featured by a fact that a notice requesting the urgent delivery of the expendable of a type showing no inventory is informed by the center system to the person in charge of delivery (service personnel or distributing person in charge), in case the center system detects the absence of inventory, executes the corresponding order instruction and instructs the delivery of the expendable corresponding to the absence of inventory but a further decrease of the inventory or absence of inventory for the expendable of the type corresponding to the aforementioned absence of inventory is informed to the center system.

Then a step S3316 transmits a confirmation mail based on the detailed customer information (for example e-mail address) specified in the step S3314 from the center system to the user base system. The address of the confirmation mail in the step S3316 is set in advance in the center system, and can be, for example, the e-mail address assigned to an information processing apparatus to be utilized by the manager in the user base system or address information assigned to the device monitor server 230a or the PC monitor client 203d. In case there is assigned the address of the device monitor server 230a or the PC monitor client 203d, such device monitor server 230a or PC monitor client 203d receiving the confirmation mail transfers such mail to a destination set as the manager address.

The confirmation mail transmitted to the user in the step S3316 may include the information as shown in FIG. 26, but the objects of the present invention can be attained by any information including a function enabling the user to confirm the order for the expendable and to approve the ordering.

Then a step S3321 discriminates whether a response to the confirmation mail (transmission history of the information indicating confirmation) transmitted in the step S3316 is received from the user base system. If a step S3315 identifies the presence of a confirmation mail, a step S3323 transmits an instruction for delivering the expendable of the type and amount included in the information from the user base system in the step S3321 to the distribution organization (information processing apparatus thereof) and the portable terminal owned by the person in charge (service personnel or distributing person in charge). In response, processes of steps S3324 to S3328 are executed thereafter. The processes of the steps S3319 to S3322 are identical with those of the steps S2109 to S3322 and will not, therefore, be explained further.

In another preferred embodiment, the processes of the steps S3315, S3318, S3319 and S3320 may be executed in the user base system after the step S3305 identifies 'Yes'. In such case, the turning 'ON' of the order flag in the step S3322 is informed to a server provided in the user base system (for example 203 in FIG. 1), which executes the processes corresponding to the steps S3315, S3318 and S3319 j; based on the informed information indicating that the order flag is 'ON'. It is assumed that the server of the user side stores the information on the person in charge for executing the delivery or the destination of communication (for example e-mail address) to the center system. Also the information indicating that the order flag is 'ON' includes at least information indicating the type of the expendable showing no inventory. Such execution of the processes of the steps S3315, S3318 and S3319 in the user base side provides an advantage of alleviating the process in the center system.

Other Embodiments

The objects of the present invention can also be attained in a case where a memory medium storing the program codes of a software realizing the functions of the aforementioned embodiments is supplied to a system or an apparatus and a computer (or CPU or MPU) of such system or apparatus reads and executes the program codes stored in the memory medium.

In such case, the program codes themselves read from the memory medium realize the novel functions of the present invention, and the memory medium storing the program codes constitutes the present invention.

Also the data of device information may be stored in an HDD incorporated in an image processing apparatus or an image data developing apparatus, in an externally connected memory medium, or a server accessible from the image data developing apparatus. Furthermore, the data of the device information may be arbitrarily set by the user.

The memory medium supplying the program codes can be, for example, a floppy disk, a hard disk, an optical disk, a magnetooptical disk, a CD-ROM, a CD-R, a DVD-ROM, a magnetic tape, a non-volatile memory card or a ROM.

Further, the present invention includes not only a case where the computer executes the read program codes thereby realizing functions of the aforementioned embodiments but also a case where an OS (operating system) or the like functioning on the computer executes all the actual processes or a part thereof under the instructions of the program codes thereby realizing the functions of the aforementioned embodiments.

The present invention further includes a case where the program codes read from the memory medium are once stored in a function expansion board inserted into the computer or a function expansion unit connected thereto and a CPU or the like provided in such function expansion board or function expansion unit executes all the actual processes or a part thereof under the instructions of the program codes thereby realizing the functions of the aforementioned embodiments.

In case the present invention is applied to the aforementioned memory medium, the memory medium stores program codes corresponding to the aforementioned flow charts, display processes for the images and the various database processes.

As explained in the foregoing, in case equipment of plural types are used in an office or the like, the present invention enables management of inventory and ordering for each type of expendable for each type of equipment. It is therefore rendered possible to confirm the inventory corresponding to the type of expendable for various equipment used in the office, and individual ordering is enabled to alleviate the burden of the manager in achieving detailed management.

Also, since ordering can be executed for each type of the expendable, the inventory and ordering can be made for the minimum necessary expendable without waste.

It is also rendered possible to achieve unified management on the electronic equipment of two types, namely that of device type such as a printer connected as a peripheral device to the PC and that of PC/server type such as a personal computer, and to extract and appropriately manage the inventory of the expendable used in the equipment of device type.

Furthermore, the present invention enables not only the ordering of the merchandises but also the service after ordering such as the delivery of the new expendable in smooth manner.

What is claimed is:

1. An inventory management system that manages an inventory of an expendable, comprising:
   a first storage unit, adapted to store inventory information indicating an inventory number of an expendable which is mounted in a printer and can be replaced, the inventory number being reduced based on replacement of the expendable in the printer;
   a receiver unit, adapted to receive absence information indicating that the inventory number of the expendable is zero or less than a predetermined number;
   an instruction unit, adapted to provide, to an external apparatus via a communication line, a delivery instruction for delivery of a new expendable;
   a second storage unit, adapted to store history information indicating a history of the delivery instruction provided by said instruction unit; and
   an alarm sending unit, adapted (i) to send an alarm to the external apparatus via the communication line if a new reception of the absence information is received by said receiver unit after said instruction unit provides the delivery instruction for delivery of the new expendable, and if the history information is present in said second storage unit, and (ii) not to send the alarm to the external apparatus if a new reception of the absence information is received by said receiver unit, and if the history information is absent in said second storage unit.

2. A system according to claim 1, wherein the inventory information stored by said first storage unit can be monitored by an external apparatus.

3. A system according to claim 2, wherein the inventory information can be monitored by a browser provided in the external apparatus, and said first storage unit is able to output display information enabling the browser to monitor the inventory information.

4. A system according to claim 2, wherein said first storage unit stores the inventory information for each one of a plurality of expendable types, and the inventory information can be monitored for each expendable type by the external apparatus.

5. A system according to claim 4, wherein said second storage unit stores the history information for each one of the plurality of expendable types so as to show that the delivery instruction has been provided for each expendable type, and wherein the inventory information can be monitored for each expendable type by the external apparatus.

6. A system according to claim 5, further comprising an order reception unit adapted to receive an order for an expendable of any one of the plurality of expendable types from the external apparatus, wherein the external apparatus is provided with an order placement display screen having a plurality of order placement sections for respective ones of the plurality of expendable types and wherein each order placement section is activated or inactivated in accordance with the inventory number of expendable for a expendable type corresponding to the order placement section.

7. A system according to claim 1, wherein the expendable is toner or ink.

8. A system according to claim 1, wherein the absence information indicates that a remaining amount of an expendable is at a low level.

9. An inventory management control method that manages an inventory of an expendable, comprising the steps of:
   storing inventory information indicating an inventory number of an expendable which is mounted in a printer and can be replaced, the inventory number being reduced based on replacement of the expendable in the printer;
   receiving absence information indicating that the inventory number of the expendable is zero or less than a predetermined number;
   providing, to an external apparatus via a communication line, a delivery instruction for delivery of a new expendable; and
   storing in a storage unit history information indicating a history of the delivery instruction provided in said providing step; and
   sending an alarm to the external apparatus via the communication line if a new reception of the absence information is received in said receiving step after the delivery instruction for delivery of the new expendable is provided, and if the history information is present in the storage unit, and not sending the alarm to the external apparatus if a new reception of the absence information is received in said receiving step, and if the history information is absent in the storage unit.

10. An inventory management control method according to claim 9, wherein the stored inventory information can be monitored by an external apparatus.

11. An inventory management control method according to claim 10, wherein the inventory information can be monitored by a browser provided in the external apparatus, and further comprising the step of outputting display information enabling the browser to monitor the inventory information.

12. An inventory management control method according to claim 10, wherein the inventory information for each one of a plurality of expendable types is stored, and the inventory information can be monitored for each expendable type by the external apparatus.

13. An inventory management control method according to claim 12, wherein the history information for each one of the plurality of expendable types is stored so as to show that the delivery instruction has been provided for each expendable type, and wherein the inventory information can be monitored for each expendable type by the external apparatus.

14. An inventory management control method according to claim 13, further comprising the step of receiving an order for an expendable of any one of the plurality of expendable types from the external apparatus, wherein the external apparatus is provided with an order placement display screen having a plurality of order placement sections for respective ones of the plurality of expendable types and wherein each order placement section is activated or inactivated in accordance with the inventory number of expendable for a expendable type corresponding to the order placement section.

15. An inventory management control method according to claim 9, wherein the expendable is toner or ink.

16. An inventory management control method according to claim 9, wherein the absence information indicates that a remaining amount of an expendable is at a low level.

17. A computer program stored on a computer-readable medium to be executed by an inventory management system that manages an inventory of an expendable, comprising the steps of:

storing inventory information indicating an inventory number of an expendable which is mounted in a printer and can be replaced, the inventory number being reduced based on replacement of the expendable in the printer;

receiving absence information indicating that the inventory number of the expendable is zero or less than a predetermined number;

providing, to an external apparatus via a communication line, a delivery instruction for delivery of a new expendable; and storing in a storage unit history information indicating a history of the delivery instruction provided in said providing step; and sending an alarm to the external apparatus via the communication line if a new reception of the absence information is received in said receiving step after the delivery instruction for delivery of the new expendable is provided, and if the history information is present in the storage unit, and not sending the alarm to the external apparatus if a new reception of the absence information is received in said receiving step, and if the history information is not present in the storage unit.

18. A computer program according to claim 17, wherein the stored inventory information can be monitored by an external apparatus.

19. A computer program according to claim 18, wherein the inventory information can be monitored by a browser provided in the external apparatus, and further comprising the step of outputting display information enabling the browser to monitor the inventory information.

20. A computer program according to claim 18, wherein the inventory information for each one of a plurality of expendable types is stored, and the inventory information can be monitored for each expendable type by the external apparatus.

21. A computer program according to claim 20, wherein the history information for each one of the plurality of expendable types is stored so as to show that the delivery instruction has been provided for each expendable type, and wherein the inventory information can be monitored for each expendable type by the external apparatus.

22. A computer program according to claim 21, further comprising the step of receiving an order for an expendable of any one of the plurality of expendable types from the external apparatus, wherein the external apparatus is provided with an order placement display screen having a plurality of order placement sections for respective ones of the plurality of expendable types and wherein each order placement section is activated or inactivated in accordance with the inventory number of expendable for a expendable type corresponding to the order placement section.

23. A computer program according to claim 17, wherein the expendable is toner or ink.

24. A computer program according to claim 17, wherein the absence information indicates that a remaining amount of an expendable is at a low level.

* * * * *

UNITED STATES PATENT AND TRADEMARK OFFICE
CERTIFICATE OF CORRECTION

PATENT NO. : 7,275,101 B2
APPLICATION NO. : 09/987486
DATED : September 25, 2007
INVENTOR(S) : Kojiro Katayama et al.

It is certified that error appears in the above-identified patent and that said Letters Patent is hereby corrected as shown below:

DRAWING SHEET 10:

Fig. 10, "DISTRIBUTER" should read --DISTRIBUTOR--.

DRAWING SHEET 11:

Fig. 11, "DISTRIBUTER" should read --DISTRIBUTOR--.

DRAWING SHEET 24:

Fig. 24, "DRDER" should read --ORDER--.

DRAWING SHEET 26:

Fig. 27, "DRDER" (all occurrences) should read --ORDER--.

COLUMN 1:

Line 20, "are" should read --is--; and
    Line 31, "have" should read --has--.

COLUMN 3:

Line 26, "system." should read --system; and--.

COLUMN 4:

Line 16, "managing" should read --manage--.

COLUMN 10:

Line 58, "backend" should read --back end--;
    Line 60, "backend" should read --back end--; and
    Line 65, "backend," should read --back end,--.

UNITED STATES PATENT AND TRADEMARK OFFICE
CERTIFICATE OF CORRECTION

| | | |
|---|---|---|
| PATENT NO. | : 7,275,101 B2 | |
| APPLICATION NO. | : 09/987486 | |
| DATED | : September 25, 2007 | |
| INVENTOR(S) | : Kojiro Katayama et al. | |

It is certified that error appears in the above-identified patent and that said Letters Patent is hereby corrected as shown below:

COLUMN 12:

Line 64, "device etc.)" should read --device, etc.)--.

COLUMN 13:

Line 14, "etc." should read --etc.,--; and
    Line 20, "system," should read --systems,--.

COLUMN 15:

Line 9, "101a;" should read --1001a;--; and
    Line 56, "and" should be deleted.

COLUMN 16:

Line 39, "backend," should read --back end,--; and
    Line 52, "backend (S1307)" should read --back end (S1307)--.

COLUMN 17:

Line 4, "backend (S1402)." should read --back end (1402).--;
    Line 21, "backend (S1507)." should read --back end (S1507).--;
    Line 24, "backend (S1508)." should read --back end (S1508).--; and
    Line 42, "backend" should read --back end--.

COLUMN 19:

Line 12, "server A etc. is same" should read --server A, etc., is the same--;
    Line 28, "printer A etc." should read --printer A, etc.,--; and
    Line 30, "PC etc." should read --PC, etc.,--.

UNITED STATES PATENT AND TRADEMARK OFFICE
CERTIFICATE OF CORRECTION

| | | |
|---|---|---|
| PATENT NO. | : 7,275,101 B2 | |
| APPLICATION NO. | : 09/987486 | |
| DATED | : September 25, 2007 | |
| INVENTOR(S) | : Kojiro Katayama et al. | |

It is certified that error appears in the above-identified patent and that said Letters Patent is hereby corrected as shown below:

COLUMN 20:

Line 11, "management etc." should read --management, etc.,--; and
Line 21, "personnel etc." should read --personnel, etc.,--.

COLUMN 21:

Line 1, "own" should read --one---;
Line 26, "expendable or the number of printer," should read --expendables or the number of printers,--; and
Line 51, "informing" should read --information--.

COLUMN 22:

Line 43, "informing" should read --information--;
Line 44, "internet." should read --Internet.--; and
Line 45, "internet" should read --Internet--.

COLUMN 23:

Line 7, "(internet" should read --(Internet--; and
Line 43, "allows" should read --allow--.

COLUMN 24:

Line 1, "expendable" should read --expendables--.

COLUMN 27:

Line 35, "expendable" should read --expendables--; and
Line 50, "expendable" should read --expendables--.

UNITED STATES PATENT AND TRADEMARK OFFICE
CERTIFICATE OF CORRECTION

PATENT NO. : 7,275,101 B2
APPLICATION NO. : 09/987486
DATED : September 25, 2007
INVENTOR(S) : Kojiro Katayama et al.

It is certified that error appears in the above-identified patent and that said Letters Patent is hereby corrected as shown below:

COLUMN 29:

Line 26, "providing" should read --provides--; and
Line 27, "through" should read --though--.

COLUMN 30:

Line 38, "S3319 j;" should read --S3319--.

COLUMN 32:

Line 39, Claim 6 "expendable for a" should read --expendables for an--; and
Line 58, Claim 9 "and" should be deleted.

COLUMN 33:

Line 34, Claim 14 "able for a" should read --ables for an--.

COLUMN 34:

Line 3, Claim 17 "and" should be deleted.

Signed and Sealed this

Fourth Day of November, 2008

JON W. DUDAS
*Director of the United States Patent and Trademark Office*